United States Patent [19]
Durbin

[11] Patent Number: 5,834,749
[45] Date of Patent: *Nov. 10, 1998

[54] OPTICAL IMAGE CAPTURE SYSTEM FOR READING TARGETS AT OBLIQUE ANGLES

[76] Inventor: Dennis A. Durbin, 140 Cambridge Dr. NE., Cedar Rapids, Iowa 52402

[*] Notice: The term of this patent shall not extend beyond the expiration date of Pat. No. 5,500,576.

[21] Appl. No.: 708,264

[22] Filed: Sep. 6, 1996

Related U.S. Application Data

[63] Continuation-in-part of Ser. No. 616,469, Mar. 19, 1996, abandoned, which is a continuation-in-part of Ser. No. 343,754, Nov. 22, 1994, Pat. No. 5,500,516, which is a continuation-in-part of Ser. No. 300,178, Sep. 2, 1994, abandoned, which is a continuation-in-part of Ser. No. 298,257, Aug. 30, 1994, abandoned.

[51] Int. Cl.$^6$ .................................................. G06K 7/10
[52] U.S. Cl. .......................... 235/454; 235/462; 235/472
[58] Field of Search ................................... 235/454, 435, 235/439, 462, 467, 470, 472, 476

[56] References Cited

U.S. PATENT DOCUMENTS

| | | | |
|---|---|---|---|
| 4,096,992 | 6/1978 | Nojiri et al. | 235/462 |
| 4,335,302 | 6/1982 | Robillard | 235/462 |
| 4,877,949 | 10/1989 | Danielson et al. | 235/462 |
| 5,019,699 | 5/1991 | Koenck | 235/462 X |
| 5,189,291 | 2/1993 | Siemiatkowski | 235/462 X |
| 5,278,399 | 1/1994 | Sano | 235/472 |
| 5,359,185 | 10/1994 | Hanson | 235/472 |
| 5,428,212 | 6/1995 | Tani et al. | 235/472 |
| 5,500,516 | 3/1996 | Durbin | 235/472 |

*Primary Examiner*—Donald T. Hajec
*Assistant Examiner*—Michael G. Lee
*Attorney, Agent, or Firm*—Akin, Gump, Strauss, Hauer & Feld, L.L.P.

[57] ABSTRACT

A portable hand-held reader unit for reading two-dimensional information and generating an image therefrom wherein an optical axis of the reader is oriented obliquely to the surface containing the coded information. The reader includes a sensing system designed such that the rectilinear dimension of the generated image corresponding to an axis of the coded information undergoing the most distortion from oblique reading is magnified, by the lens system or the resolution configuration of the image sensor, to a greater extent than that of the rectilinear dimension undergoing the least distortion from oblique reading. Alternatively, the sensor is oriented relative to the optical axis such that the received image does not exhibit the distortion which may result from oblique reading. The coded information may contain height-to-width ratio of the coded information such that the generated image can be automatically corrected for distortion from oblique reading. Ranging marker beams may be used in conjunction with the obliqueness correcting embodiments to align the reader with the coded information.

19 Claims, 12 Drawing Sheets

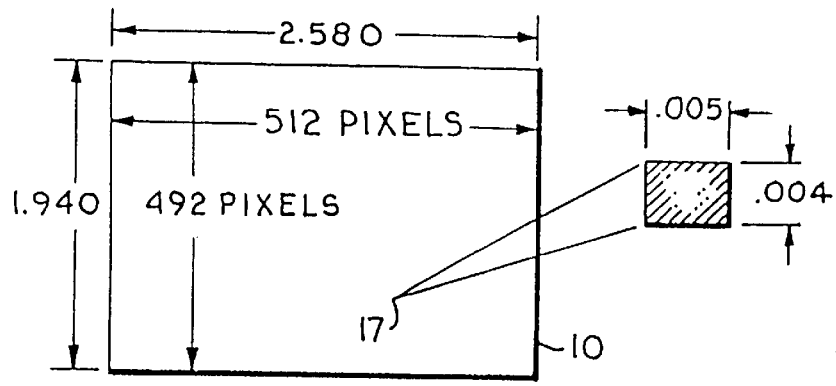
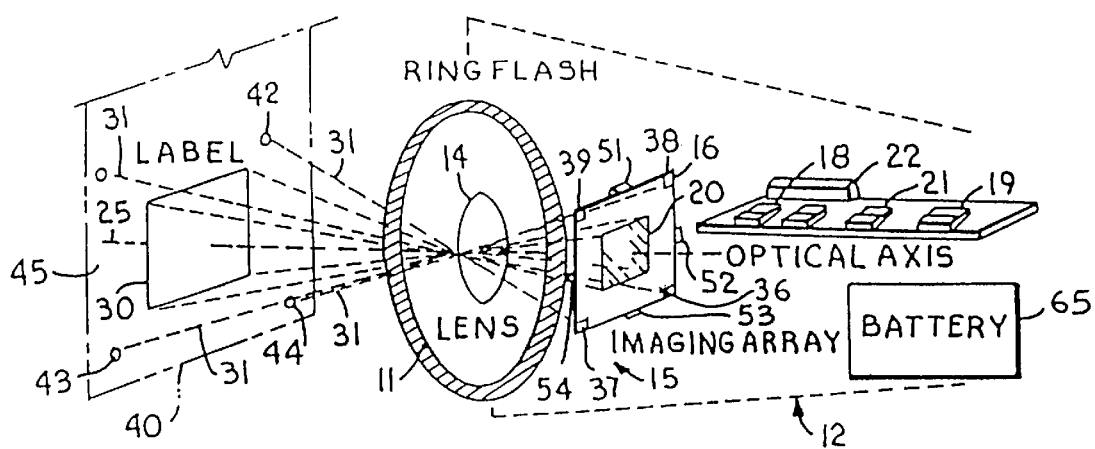

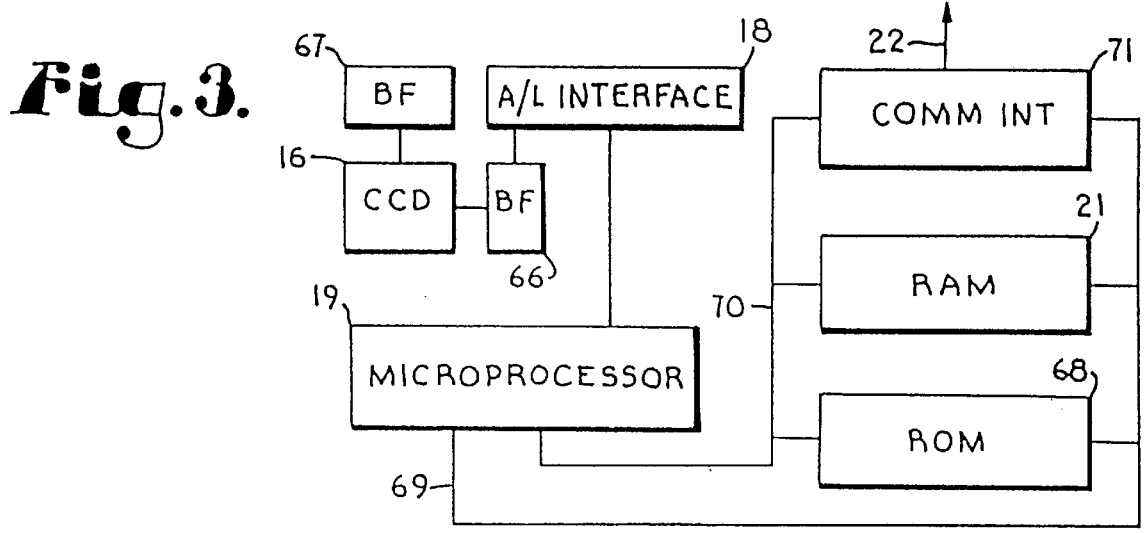
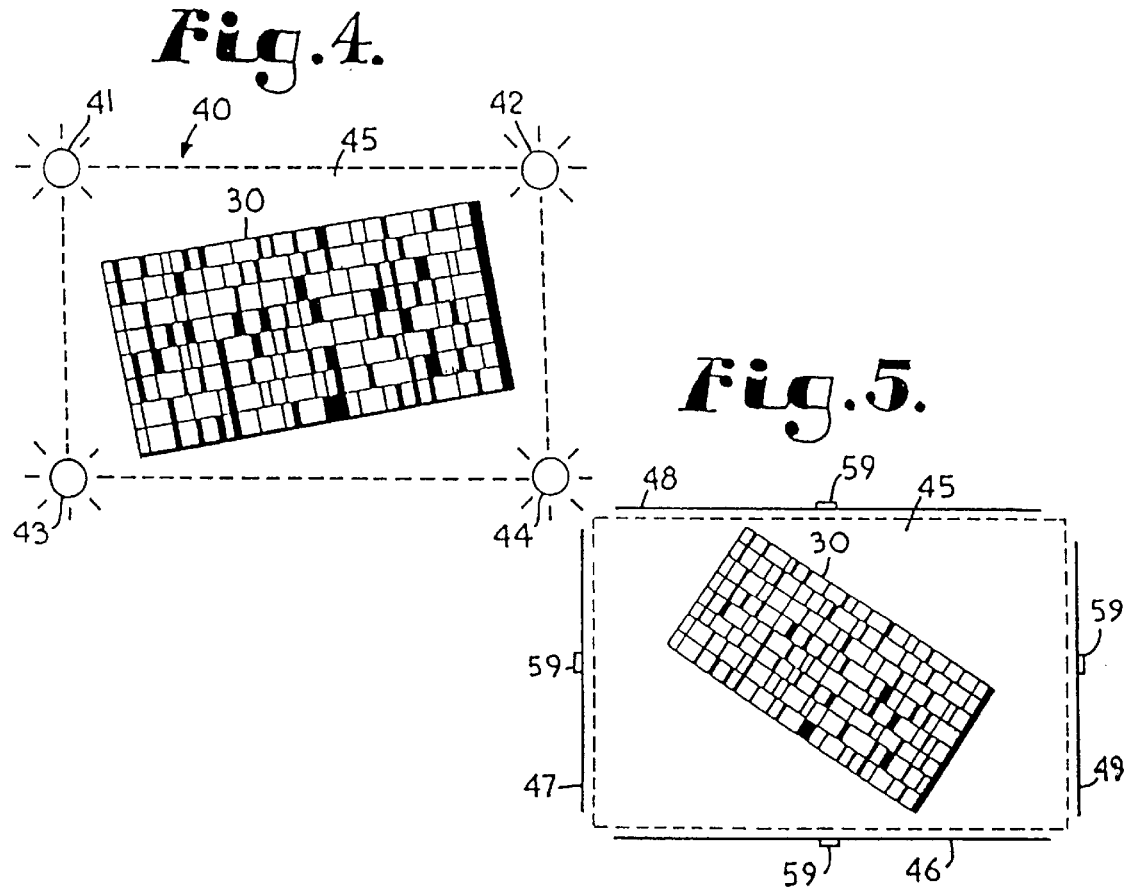

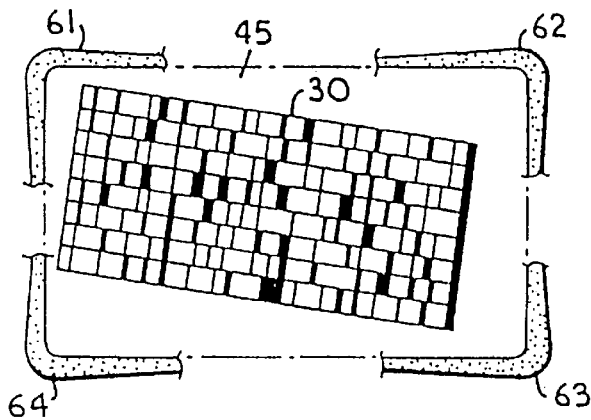
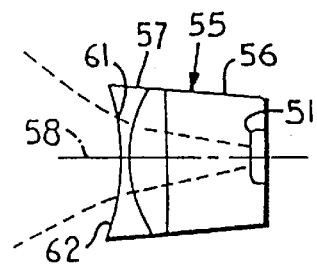
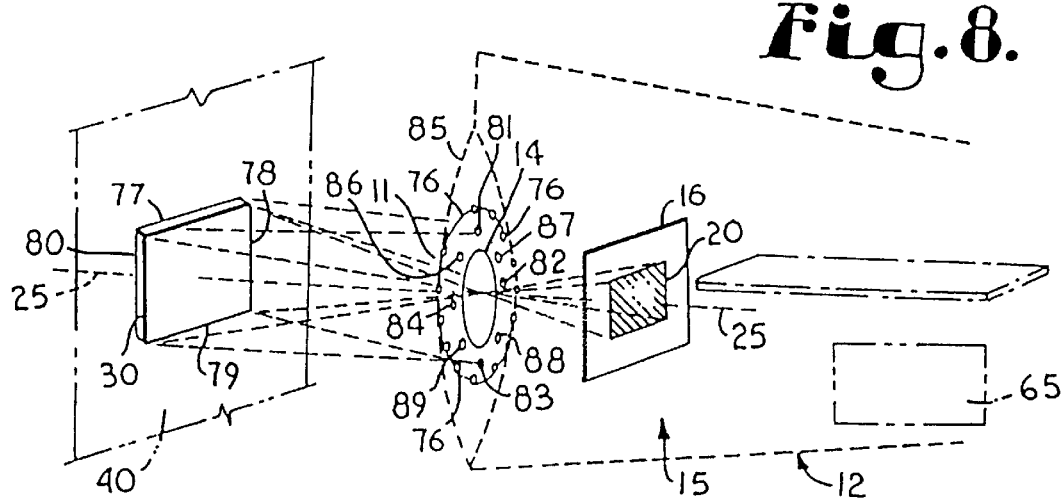

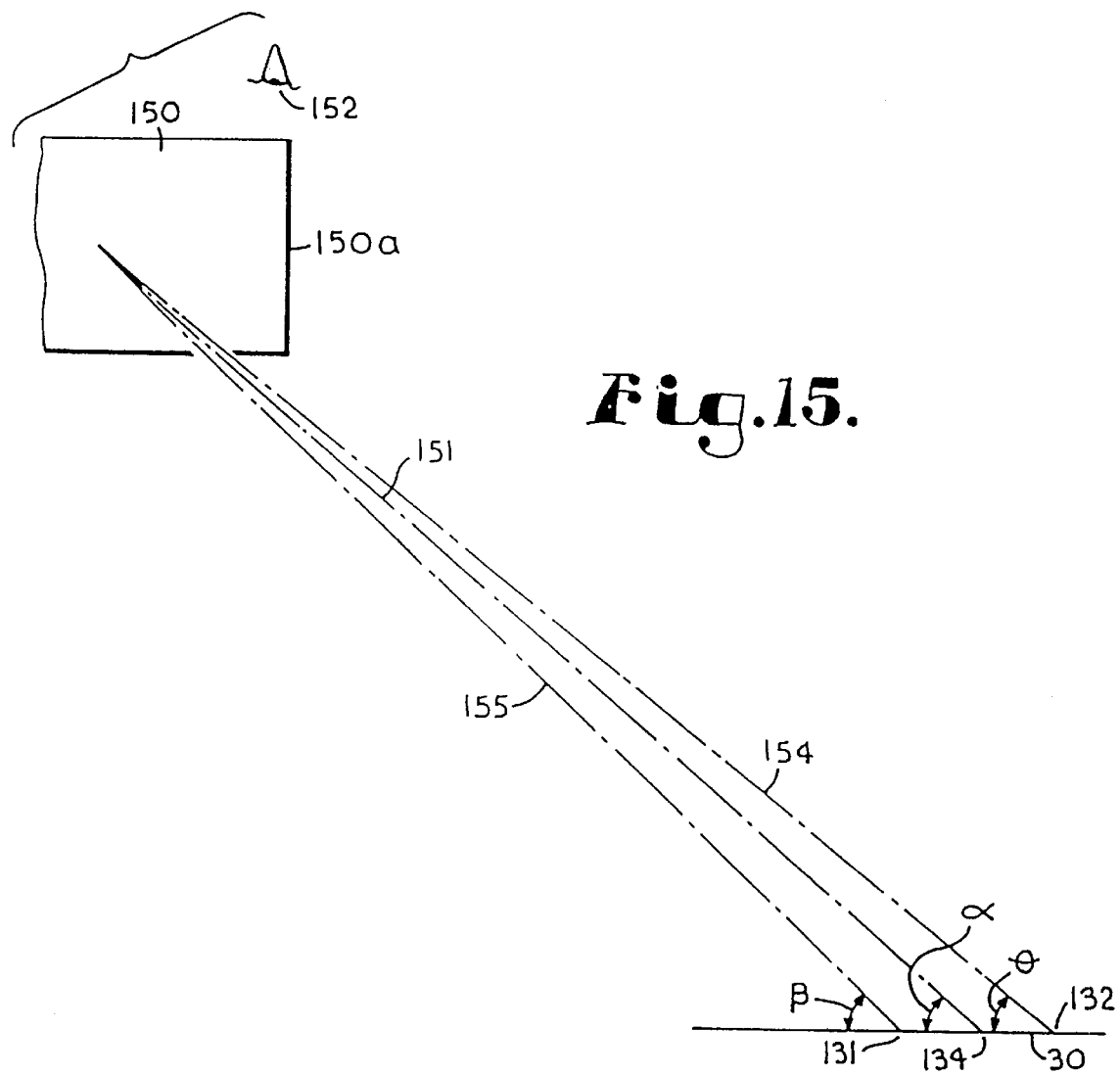

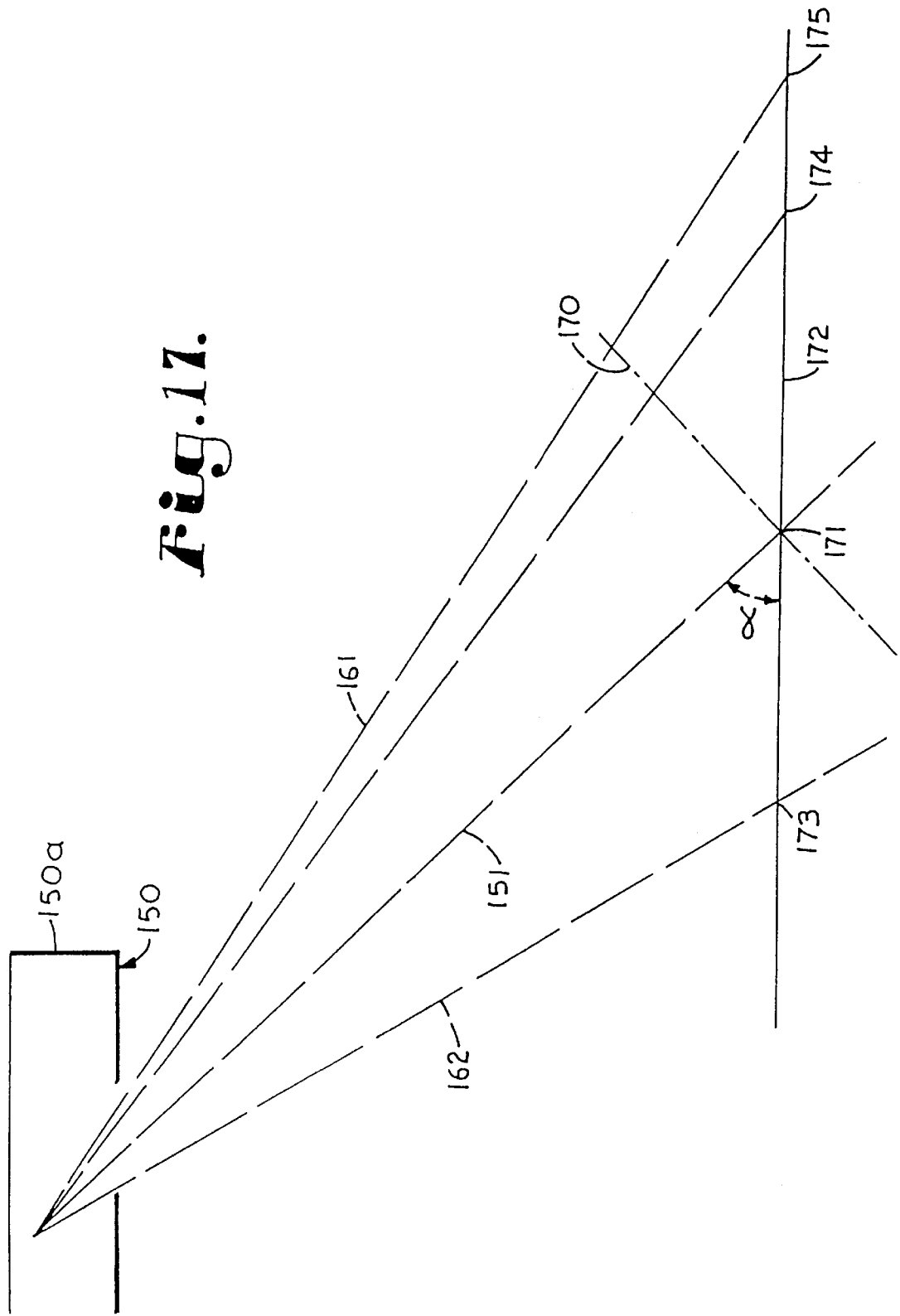

OPTICAL IMAGE CAPTURE SYSTEM FOR READING TARGETS AT OBLIQUE ANGLES

Cross-Reference to Related Application

The present application is a continuation-in-part of U.S. Ser. No. 08/616,469 filed Mar. 19, 1996, now abandoned, which was itself a continuation-in-part of U.S. Ser. No. 08/343,754 filed Nov. 22, 1994, now U.S. Pat. No. 5,500,516, which was itself a continuation-in-part of U.S. Ser. No. 08/300,178 filed Sep. 2, 1994, now abandoned, which was itself a continuation-in-part of U.S. Ser. No. 08/298,257 filed Aug. 30, 1994, now abandoned.

TECHNICAL FIELD OF THE INVENTION

The invention relates generally to code readers and particularly to readers which sense optically discernible symbol combinations or codes, such as bar codes and two dimensional codes.

Discussion of Related Art

Although some progress has been made in the development of an optical reader for two dimensional information that has the capability to be operated portably, a potential problem with an existing tablet type reader is the unavailability of a clear, unobstructed view of the target surface during the reading process. It is conceived that what is needed is a reliable hand-held optical reader that allows accurate oblique reading and decoding of coded information. A reader is needed which does not interfere with an operator's view of the targeted coded information during the reading process.

SUMMARY OF THE INVENTION

This invention provides an improved apparatus and method for a hand-held optical reader. The method and apparatus permit accurate reading and decoding of images from optical indicia on a target surface even where the surface is oriented obliquely to the optical axis of the reader. An important feature of the invention achieves the substantial elimination of the image distortion normally inherent in oblique reading.

In a preferred version of the invention, a portable terminal unit with a tablet configuration and an optical reader has an optical window located along the underside of the terminal unit. The optical window defines a major plane The reader has a given depth of field and field of view at a given range from the optical window. The optical axis of the reader passes through the optical window and is oriented obliquely to the optical window. When the terminal unit is parallel to the target surface, at least a portion of the field of view is displaced horizontally from the terminal unit to facilitate user alignment of the optical axis with the information to be read.

In addition, the optical reader preferably has an area-type image sensor defining a sensor plane. The sensor plane can be oblique to the optical axis of the reader. The purpose of the oblique orientation is, in part, to optimize the focus of the optical reader on that portion of the target surface horizontally offset from the terminal unit.

In a further aspect of the invention, the terminal unit has processing means for constructing a generated image from an image received by the image sensor. Preferably, the generated image effectively corresponds to the image which would be captured if the target surface portion and the sensor plane each had been oriented perpendicularly to the optical axis. Standardized recognition processing can then be performed on the generated image.

Alternatively, the processing means can be supplemented and obviated entirely by an optical imaging system tailored to compensate for the distortion caused by the oblique scanning. This can be accomplished, for example, by using an image sensor with an application specific resolution pattern, by tilting the image sensor in a corrective fashion relative to the optical axis, or by including a lens system designed to compensate for the distorted image received from the target portion. The image acquired in such a manner would be substantially equivalent to the generated image noted above.

An improved terminal unit may also include an on-board decode processor capable of decoding a two-dimensional code. The decode processor can decode the reflected image when the major plane of the terminal unit is parallel, or parallel within a given tolerance range, to the plane of the target surface. If the tilt of the terminal unit relative to the target surface is greater than the given tolerance range, the results of the processing will be unreliable. In such a case, the terminal unit can immediately inform the user of the improper alignment while suppressing any activity by the decode processor so as to conserve battery energy and increase efficiency.

The terminal unit may also provide one or more converging ranging marker beams. Each of the ranging marker beams produces a marker spot on the target surface portion. Preferably, each marker spot has a margin proximate to the optical axis as the terminal unit is positioned at a distance from the target corresponding to the given optimum range.

Each of the ranging marker spots has a maximum dimension of approximately one inch or less over the operating range of the terminal reader. Further, each has a margin approximately within one inch of the intersection of the optical axis with the target surface portion when the reader is positioned so that the target surface portion is within the reader's depth of field. The distance from the terminal unit to the target surface portion may, for example, correspond to the optimum range when the marker spot is centered on the optical axis and aligned with a central longitudinal axis of the terminal unit. For applications and embodiments wherein the terminal unit employs two converging ranging marker beams, the beams may be directed to converge toward the optical axis from opposite sides thereof.

Therefore, principal features of the present invention include: oblique reading of a two dimensional code; providing a user supported optical reader having at least one marker beam directed obliquely to the optical axis and impinging on a target surface at a location that a user can correlate with the reader's spacing from the target surface; and providing a battery powered portable reader that is reliable, easy to use, efficient in operation and particularly well adapted for user manipulation in reading one dimensional and two dimensional codes in various orientations.

Other principal objects, features and advantages of the invention will become apparent from the following description and accompanying drawings, which set forth, by way of illustration and example, certain specific embodiments of this invention.

BRIEF DESCRIPTION OF THE DRAWINGS

FIG. 1 is a diagram for illustrating the optical sensing area defined by a field of view of a lens system, such as from the use of a typical solid state video imaging array and a lens system with a magnification ratio of ten to one, in a hand-held optical reader in accordance with the present invention;

FIG. 1A illustrates an example of an image sensor having a sufficiently greater pixel density in the vertical direction than in the horizontal direction so as to accommodate viewing of a target surface oriented at approximately forty-five degrees to the optical axis rather than orthogonally;

FIG. 2 is a diagrammatic illustration of a preferred form of a hand-held optical reader in accordance with the present invention, arranged so as to have its optical sensing area or field of view completely encompassing the machine-readable code (e.g. bar code) or human-readable information (e.g. line or lines of text) on a label so that a complete instantaneous optical image thereof is projected onto an area array of photosensors within the reader and may be converted by the reader into digital image data and stored in a processor memory of the reader;

FIG. 3 is a block diagram illustrating a typical logic arrangement of a microprocessor circuit and the major functional components as are typically associated with such a circuit, and further illustrating an interface between the array of photosensors of the reader referenced in FIG. 2 and the microprocessor;

FIG. 4 is an illustration of a stacked bar code and of one of the manners in which a field of view of the optical reader is indicated to a user to facilitate alignment of the field of view with a label bearing indicia such as the stacked bar code;

FIG. 5 is an illustration of an alternate manner for indicating to a user of the optical reader the field of view of the information gathering elements in accordance with the invention;

FIG. 6 is an illustration of yet another manner for indicating the field of view of the optical reader;

FIG. 7 shows a schematically simplified view of a light source and related linear optics for delineating the field of view of the optical reader as further described herein;

FIG. 8 is a diagrammatic illustration showing the reader of FIG. 2 and illustrating alternative embodiments relating to flashable light sources and aiming aids such as marker sources;

FIG. 15 illustrates the use of a hand-held optical reader to read coded information with the optical axis directed obliquely to the target so that an operator may have an unobstructed view of the target surface for aiming purposes.

FIG. 15 also illustrates the change of viewing angle for various points on a target surface.

FIG. 16 illustrates that oblique reading permits the operator to view the coded label without interference from the terminal unit.

FIG. 17 shows the field of view and the depth of field of a preferred optical reader embodiment with its optical axis oriented obliquely to the target surface.

DETAILED DESCRIPTION OF THE INVENTION

Figure 9:
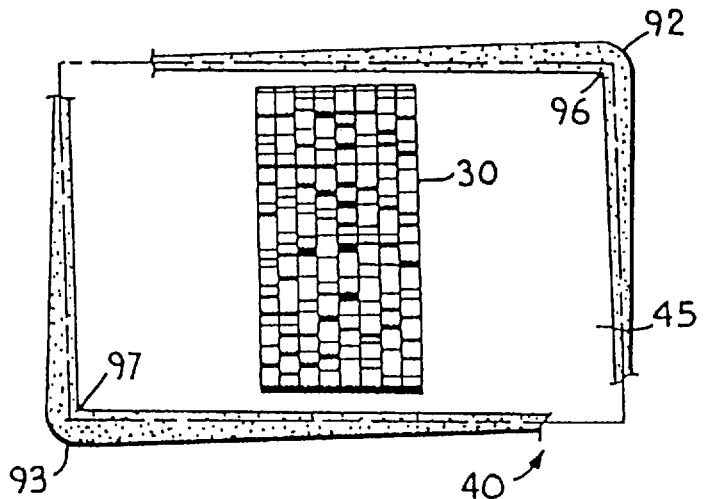
FIG. 9 shows another embodiment for delineating to a user of the reader its field of view, also showing a stacked bar code label encompassed in a vertical orientation within the delineated field of view.

With respect to each of the embodiments disclosed herein, the following related disclosures are hereby incorporated by reference in their entireties:

| Application Number | Filing Date | Publication Date |
| --- | --- | --- |
| PCT/US92/02139 | 10 March 1993 | |
| PCT/US92/06157 | 23 July 1992 | 22 July 1993 as WO 93/14470 |
| PCT/US93/12459 | 12 December 1993 | 7 July 1994 as WO 94/15314 |
| PCT/US94/05380 | 11 May 1994 | 16 Sept. 1993 as WO 93/18478 |
| PCT/US_/_ | 16 November 1994 | |
| US 08/616,469 | 19 March 1996 | |
| US 08/343,754 | 22 November 1994 | |
| US 08/300,178 | 2 September 1994 | |
| US 08/298,257 | 30 August 1994 | |
| US 07/972,822 | 6 November 1992 | |
| Patent Number | Issue Date | |
| US 5,019,699 | 28 May 1991 | |

These incorporated disclosures describe techniques for assisting in aiming by displaying the field of view of a code reader for observation by the operator during aiming, and for using ranging marker beams to assist in automatically setting the focus of an optical system. These techniques may be employed for displaying on a screen, confronting the user, the location of one or more marker spots as described herein and a target code or bullseye, to assist in aiming without direct viewing of the marker spot or spots by the operator. Also, the marker spot or spots as described herein can provide range information to the area-type sensors as described herein to enable automatic focus adjustment. With the marker beams active as described herein, the sensor and processing system can detect when the focus setting is correct and when the bullseye or other feature of the code is appropriately located, and automatically trigger the actual reader operation (with marker beams off) including any needed level of flash illumination of the code region.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The biggest negatives surrounding the use of portable code reading systems have related to the inherent weaknesses of the available hand-held scanner technology. The purpose of the described invention is to substantially improve the performance and capabilities of hand-held optical reading devices so that this inherently convenient coding method can become a viable alternative for automatic identification applications.

The invention consequently seeks to eliminate the need for accurately spacing the reader substantially perpendicularly to the codes being read. A reading device in accordance with the invention would therefore desirably include a provision for instantaneously illuminating a region exterior to the reader, which region contains the combination of codes or characters to be read. Thus, during a single instance of illumination, the selective reflection representing relatively darker and lighter elements of the code configuration to be read may be imaged or focused with suitable optics at an interior region within the reader, the interior region being referred to also as an imaging area.

An array of photosensor elements is disposed at the interior imaging area. During the instant of illumination, the photosensor elements of the interior region receive a complete light image or optical image from any information at the exterior region. The instantaneous transfer of the image to the imaging area substantially eliminates risk of error due to an operator causing an inadvertent movement of the reader.

When reading two dimensional information patterns, a possible source of difficulty in aiming was recognized, however. Such potential aiming problems may be minimized, if not totally eliminated, when an operator can obliquely read the coded information in a manner whereby the reading unit does not interfere with the operator's view of the coded information and whereby any rectilinear distortion of the received image arising from the oblique scanning can be automatically optically and/or electronically corrected. (The concept of reading two dimensional patterns obliquely to facilitate aiming is illustrated in FIG. 15.) According to the invention, it is, consequently, contemplated to identify or mark the region from which optical information would be transferred to the area array of photosensor elements or photosensor array and to automatically optically and/or electronically correct for any rectilinear distortion arising from such oblique scanning.

As a specific example, marker beams originating from light sources at the four corners of the photosensor array may be projected via suitable optics onto a supporting surface carrying the information, such as a label, to be read. Optical systems, such as non-spherical lenses, can shape the beams to linearize the marker spots impinging on the information bearing surface. In the case of marker beams of elongate, linearized cross section, the light sources need not be located at the corners of the photosensor array. Conveniently, the optics used for projecting and focusing the image onto the photosensor array may be used for directing and focusing the marker beams.

In accordance with the incorporated Koenck disclosures (U.S. Pat. No. 5,019,699 and application Ser. No. 07/972, 822), the marker beams bracket the optical field of view of the photosensor array, desirably in alignment with the periphery thereof. Consequently, any information within the region bounded by the marker beams is necessarily projected or focused onto the photosensor array. The information to be read may be, for example, in the form of linear bar codes or two-dimensional codes.

Once the image is focused on the photosensor array, the output of each photosensor element may be electrically read and stored in accordance with data processing techniques. The recorded or stored image, however, is a raw image. It is the unprocessed signal received during the instance of illumination. The raw image may contain, for example, an image of dirt spots that have adhered to portions of a bar code.

One advantage of the incorporated Koenck disclosures and the present invention over traditional deflected beam scanner units is that it records or stores an image of the entire area containing the code instantaneously (for example, within a time interval during which normal manual unsteadiness can be neglected). A traditional scanner typically reads, for example, only a line or section through a bar code. Repeated scans then permit calculation of an average reading. Any movement of the scanner unit during the repeated scans reduces the accuracy of the average reading.

Figure 11:
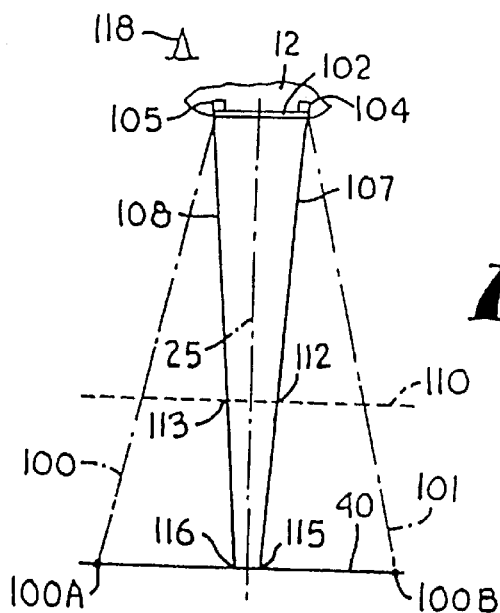
FIG. 11 shows a pair of marker beams converging toward an optical axis of the optical reader as a function of the spacing of the optical reader from a target area, in accordance with the present invention.

On the other hand, the preferred readers of the incorporated Koenck disclosures and of the further embodiments of, for example, FIGS. 11 et seq. herein, instantaneously receive a reflected image of the entire information pattern. Consequently, a number of such readings can be taken. Comparison to fixed or stored information then verifies the results. Also, known data processing techniques can transform the stored image of a data code into a standardized orientation.

Another advantage is being realized as a result of recently developing trends in the code marking art. With increasing understanding of data processing techniques for inventory handling and merchandising operations in general, a need has emerged to pack more information into each single code combination or code cluster. Recent developments suggest replacing conventional single line bar codes with multi-line bar code patterns having a more densely packed configuration. Codes having these new configurations are generally known as "stacked bar codes."

Simply stated, stacked bar codes are somewhat like a page of printed material. They are compressed in the direction perpendicular to the traditional reading direction and arranged in a multi-line stacked configuration. In other words, stacked bar codes can be visualized as a collection of linear bar codes stacked on top of each other. The result is a square or rectangular region of parallel linear bar codes.

A number of different standards for stacked bar codes exist. Two examples are "Code 49" and "16K." Code 49 may consist of stacked lines or rows of code indicia two to eight rows high. The 16K code may use stacked rows of code indicia between two and sixteen rows high.

It is understandable that when traditional two dimensional code readers read at an angle that is not substantially orthogonal to the target surface, code recognition problems result. Usually, if the entire code on the target surface is not recognized, a misread signal is generated which initiates a re-read cycle. It is, of course, desirable to recognize the code on the first read. Repetition of reading operations requires extra operator time and battery power.

Lateral shift provides another source of operational inefficiency. As with oblique viewing of two dimensional code, a lateral shift of the reader's active area away from the label configuration can cause code recognition to fail. Therefore, causes of non-recognition include both angular viewing and lateral shift.

It is apparent that the incorporated Koenck disclosures and the current invention are particularly advantageous for reading stacked bar codes as well as other two-dimensional information. The marker beams may indicate whether the entire code pattern lies within the region imaged by the photosensor array. Also, directing one or more of the marker beams to converge toward the optical axis, provides the operator with visual information indicating whether the reader device should be moved toward or away from the surface containing the code pattern. These features eliminate major sources of error.

Significantly, distortion need not result from an oblique reading angle. A ratio of photosensor line densities, vertical to horizontal, on the image sensor can be chosen which compensate for the vertical foreshortening of the perceived code image. This yields a substantially distortion-free, obliquely read image.

Another way to eliminate such distortion, while simultaneously enhancing focus, involves use of an image sensor oriented obliquely to the optical axis. Placing the image sensor on the image focal plane related to the determined angle of reading ensures good focus and compensates for the distortion inherent in oblique reading. A third manner of distortion correction employs a lens system configured to provide varying degrees of magnification along its surface.

Furthermore, as taught in the incorporated Koenck disclosures, code processing techniques can electronically re-orient the code after storing it in the reader's computational memory. As a result, physical orientation requirements are no longer critical for later reading and decoding the stored code image. Additionally, the instantaneous exposure of the photosensor array to the code image minimizes movement of the user supported reader during image capture.

Initial processing of the image is a normalization process which is sometimes also referred to as "calibration." The calibration process can recognize the orientation of the image as well as the distortion due to the oblique reading angle. It can also reorient the image. Blemishes, such as dirt spots, may be recognized and neutralized in accordance with known image processing techniques. The calibrated image may then be decoded using a standard algorithm developed specifically for the code being read.

During the initial processing sequence, comparison of the dimensions of the received image to the known or expected dimensions of the coded information or label permits calculation of the tilt of the target area relative to the optical axis. This helps ensure that the tolerances of the reading system are not exceeded. If the tilt is not within the tolerance range, further processing is suppressed and the reader alerts the operator. Tilt computation increases efficiency and accuracy.

When the coded information, as imaged, is within the tolerance range of the reader, the dimensions of the image can be used to estimate its center. When the coded information is in the form of a square, rectangle, or some other symmetrical geometric shape, the calculation of the center location is a simple computational matter. Performance of this step increases the efficiency of decoding algorithms that begin search subroutines at the center of the label.

In FIG. 1, an optical sensing area is delineated which represents the result of the use of a typical solid state video imaging array with a lens system that provides a magnification ratio of ten to one. The resultant active area is 2.58 inches×1.94 inches as indicated.

FIG. 2 shows a diagrammatic view of an optical system that incorporates the components described. The ring flash is a preferred light source for its ability to provide relatively uniform illumination with minimum backscatter into the imaging device. Also, it may be "wrapped" around the lens, as shown, providing a compact, efficient package. The imaging array may be placed directly in line with the optical axis of the reader, so that the optical portion of a hand-held reader can be quite compact.

Operation of the reader consists of the user "aiming" at the target label and activating a switch to initiate the read. The flashtube is effective to provide an essentially instantaneous illumination, so movement of the hand-held reader during this time is noncritical. The digital processor immediately begins clocking the imaging array to read its contents which correspond to the intensity of the light from the active sensing area that was focused on the imaging array. The actual output of the imaging array is normally an analog signal. Since only white or dark information is needed, the conversion decision may consist of a comparator circuit with appropriately selected bandwidth and hysteresis to correspond to the characteristics of the imaging circuit output.

The digital information is assembled into a manageable format, such as sixteen bit data words corresponding to the word length of the digital processor and stored directly into the processor memory array. For example, an entire image may consist of 492 lines of 512 samples each for a total 251,904 bits or 31,488 bytes of information, as illustrated in FIG. 1. Once the image acquisition process is complete, the digital processor may then begin operating on the image information to remove blemish and noise components, rotate the image to a normalized position, correct for optical skew due to curvature of the target label or reading from an off-axis angle as described herein, and the like, to optimize the pattern recognition process. An important feature of the described system is the ability of the digital processor to detect during such discussed normalization the locations of blemishes or flaws in the image sensing array and to store those locations in a non-volatile memory so that flawed image data may be masked or compensated to remove such errors from consideration in the recognition algorithms.

If the reader system is configured to read and decode a specific type of code having known relative dimensions or geometric shape, the initial processing procedure can be designed to compute the angle at which the target surface is tilted relative to the optical axis. A suitable edge detection program can be used to find the boundaries of the received image. The image of a target surface that is not perpendicular to the optical axis will have distorted physical dimensions. The amount of distortion will be directly related to the degree the target surface is tilted from the perpendicular position.

For example, in the configuration of FIG. 2, if a square label is positioned so that the optical axis passes through its center and so that it is also perpendicular to the optical axis, its image will be a square. If, however, the same square label is rotated about a line drawn between the midpoints of two of its opposite sides, an image taken using the reader of FIG. 2 will be rectangular. One set of opposite sides will appear to have shrunk toward each other. The shrinkage effect increases in direct proportion to the amount the label is rotated away from the perpendicular orientation.

After correcting for the magnification ratio of the imaging system, a comparison is made of the received image's calculated dimensions and the known, stored dimensions of the label being scanned. Since the change in dimension is proportional to the coded information's angle of tilt, determination of the target surface's angle of tilt relative to the optical axis is a simple computational procedure.

Further, if the tilt is found to be so great that the tolerance limits of the reading apparatus have been exceeded, further processing could be suppressed. If the reader is a hand-held unit, the operator could be signaled that the limits have been exceeded. Alternatively, the reading system could contain an automatic triggering feature that would automatically process, without requiring an activation signal from the operator, a captured image whenever the tilt of the target surface and the range of the object were within the operational limits of the optical reader.

In order to increase the overall speed and efficiency of the decoding algorithm, it may be advantageous to estimate the center of the received image during the initial processing of the signal. The central area of the label is less susceptible to damage and data loss. Since the central area is often deemed to be the most reliable area of a coded label, that area often carries the high level or more critical data components. Also, the central area may contain an identification or acquisition mark such as a target of concentric circles. Consequently, many algorithms begin their decoding search in the central portion of the received image.

When a reader having a marker beam system is used as a hand-held unit, there is a high degree of probability that the operator has captured a label of coded information within the imaging system's field of view. As stated, marker beams can delineate the field of view for the operator. Such a situation differs from an automated process where an imaging system fixed above a moving conveyor belt is required to search an extensive area for an acquisition signal. In the hand-held embodiment, the operator takes over the role of the automatic acquisition search and, according to the teaching herein, the entire coded label becomes the acquisition means.

Once a suitable edge detection program assists in determining the received image's relative dimensions, the center of the coded information can be estimated. This is a simple computational procedure when the coded information is a rectangular or square label. The center location can be stored in memory. In the appropriate circumstances, it can be used later as a starting point for processing and decoding the contents of the label cells.

If, for example, a label and retrieval algorithm of the type described in U.S. Pat. No. 4,896,029, issued Jan. 23, 1990, to Chandler, et al., is involved, the center location could be used as a starting point for the recognition portion of the retrieval algorithm. An area could be defined about the estimated center that would, to a high degree of certainty, contain most, or all, of the acquisition target's concentric rings. The analog frequency filtering described in U.S. Pat. No. 4,896,029 could then be performed on this small, defined area.

When image normalization is complete, the recognition process may then be initiated. The first level of recognition may be to determine whether the coded information is a bar code or a line of characters or two-dimensional coded information, for example. If a bar code is recognized, standard bar code decode algorithms may be employed; if a character format is recognized, a character recognition algorithm is invoked; etc.

The digital processor employed for the image normalization, processing and recognition functions must be extremely fast and efficient for acceptable user satisfaction. A Texas Instruments TMS320C31 is an example of a processor appropriate for these functions in a battery powered user supported device. Designed for digital signal processing applications, it has extremely fast execution speeds and operates with power consumption levels acceptable for a portable hand-held unit. In the present invention, it may address external program and data memory. It may also perform bit and word manipulations.

Referring first generally to FIG. 2, there is illustrated somewhat schematically a hand-held area-type optical reader. The reader may be capable of optical character reading (OCR) as well as code reading. The reader, as will be explained, is capable of reading all the characters, bar codes or other information at an optical sensing area such as indicated at 10 in FIG. 1, essentially instantaneously. The area 10 to be read may be illuminated by light from a ring-type illuminator 11, preferably a xenon flash tube. The reader shown schematically as a hand-held unit 12, indicated by dash lines, may house the light source 11, and suitable optics, such as a lens 14. The optics 14 include a focal plane at an interior region 15 of reader 12.

A solid-state area-type photosensor array, such as indicated at 16, is disposed in the focal plane defined by the interior region 15. The photosensor array 16 is comprised of a plurality of photosensor elements arranged in an area corresponding in the sensing area 10 externally of the reader 12 to respective pixels, such as at 17, FIG. 1. The individual photosensor elements or pixels in the area array of photosensor elements or photosensor array 16 may have a density, such as in typical video cameras. Thus, the sensing area 10, as an external projection of the photosensor array 16, is enlarged with respect to the photosensor array 16 in accordance with a magnification ratio, such as ten to one, of optics of such video cameras. However, even with such enlargement of the sensing area 10, the number of pixels 17 illustrated in FIG. 1 provide an individual pixel resolution of 0.004 inch by 0.005 inch (four mils high by five mils wide).

The density of the individual photosensor elements in the photosensor array 16 need not be uniform. For imaging a target surface disposed obliquely to the optical axis, it may be advantageous to use a photosensor array containing a higher pixel density in the vertical direction than in the horizontal direction. FIG. 1A shows such a nonuniform optical sensing area.

In the example of FIG. 1A, the image sensor has a vertical pixel density of 566 pixels per inch and a horizontal pixel density of 400 pixels per inch. The image sensor has a horizontal dimension (h) of one inch and a vertical dimension (v) of one inch. An image sensor possessing a horizontal to vertical pixel density ratio similar to that of FIG. 1A may compensate for the distortion resulting from reading a label oriented obliquely, at approximately forty-five degrees, as shown and described in connection with FIG. 14 below.

The following description is generally taken from U.S. Patent application Ser. No. 071972,822, filed 06 Nov., 1992, for inventor Steven E. Koenck. This application will serve as a background introduction to the reading of two dimensional information with a user supported portable reader.

Once the flash energization of the light source 11 is complete, the photosensor array 16 may be read out, each line of photosensor elements of the array being shifted out serially for example, and the respective lines of photosensor elements being read out in parallel for example to an analog/logic interface component 18 within the hand-held reader unit 12. A signal processor 19, such as the referred to Texas Instruments TMS320C31 signal processor type, disposed in the reader unit 12 and connected with the analog/logic interface component 18, may receive from the focused information image, e.g., at 20, FIG. 2, the area image data and supply the raw area image data to an associated memory 21 in the hand-held reader unit 12 for subsequent processing in the hand-held unit. As an alternative, the raw area image data (e.g., in digital form) may be coupled via an RF or optical link 22 to a host processor (not indicated) for storage and processing. Such a separate host processor may also be portable and carried by the user.

Where the focused information image 20, such as that of a bar code or stacked bar code as shown in FIGS. 4 through 6, on the photosensor array 16 is tilted relative to the longitudinal (widthwise) axis of the array 16, the raw image data as stored in digital form may be subsequently processed so as to be rotated into a normal horizontal disposition prior to decoding thereof by well-known algorithms.

In reference to FIG. 2, the flash tube 11 and the lens 14 may have circular symmetry relative to their common longitudinal axis 25 which is consequently also the optical axis of the reader 12. Hence the illuminator or flash tube 11 is disposed annularly about the optics represented by the lens 14, so that any angle of tilt of label 30 about axis 25 is not detrimental to uniform optical imaging of the entire information field of the label 30.

Marker beams 31 originating from light sources 36, 37, 38 and 39 at the four corners of area photosensor array 16 may be projected onto a supporting surface 40 carrying label 30, via optics 14, to produce visually discernible indicia, such as marker spots 41, 42, 43 and 44, respectively, so that array 16 may be readily aligned relative to area information, e.g., on label 30, as the hand-held unit 12 is being moved into proximity thereto.

By way of example, the light sources 36–39 may be light emitting diodes at the four corners of the photosensor array 16, which light emitting diodes may be sequentially pulsed so that the marker spots 41–44 are each produced at a repetition rate of sixty per second when the hand-held reader unit is placed in a target seeking mode. Once the four marker spots "bracket" the information to be read, as indicated in FIGS. 2 and 4 through 6, regardless of tilt, or regardless of whether the information extends horizontally or vertically, the light source 11 may be triggered, marker spots 41–44 being extinguished by this time, or the wavelength thereof being prevented from affecting the photosensor array by filtering, for example.

As long as the marker spots 41 through 44 bracket the information to be read, e.g., information on the label 30, the image 20 of the entire information field is necessarily focused on the active or photosensitive area of the photosensor array 16. It should be understood that only the information and not the entire label 30 needs to become located within an area 45 of the supporting surface 40 bounded by the marker spots 41 through 44. FIG. 4 shows a stacked bar code label 30 disposed within the area 45 bracketed by the marker spots 41 through 44. Hence the image of the information represented by the stacked bars of the label 30 is projected onto and becomes focused on the active area of the photosensor array 16. Though the information is captured within the area 45 at an angle, the image 20 will still be focused on the photosensor array 16. Hence the entire image 20 with all information bearing dark and light configuration combinations of the code can be read into memory locations of the memory 21.

One manner in which the marker spots 41 through 44 define the area 45, such as described with respect to FIG. 2, is also illustrated in FIG. 4. The area 45 as indicated by dashed lines is bracketed at its corners by the marker spots 41 through 44. Thus, to line up indicia to be read, such as the stacked bar code label 30, an operator would aim the marker spots 41 through 44 so that information on the label does not extend to or beyond a straight line between two adjacent ones of the marker spots.

FIG. 5 illustrates another manner of delineating the area 45. In lieu of the marker spots 41 through 44, FIG. 5 shows linear illumination bars 46, 47, 48 and 49 which closely bound the area 45, as depicted again by the dashed lines. It may be preferred to mark the area 45 by a linear illumination outline comprised of the illumination bars 46 through 49 in that the photosensor array may be allowed to contain an uninterrupted matrix without the need to preserve corner locations thereof for the light emitting diode as described with respect to FIG. 4.

Briefly referring back to FIG. 2, the illumination spots or bars 46 through 49 may be produced by light sources, such as light emitting diodes or laser diodes in combination with linear lenses, which may be disposed in the focal plane 15 at midpoints of each of the edges of and directly adjacent the photosensor array 16, as indicated by the numerals 51, 52, 53 and 54 respectively. Thus, as with respect to the earlier described example, the optics 14 may be used to direct light beams resulting in the marker bars 46 through 49 through the optics 14 against the surface 40.

FIG. 5 shows the label 30 disposed at an increased angle with respect to the major outline of the area 45 and of a smaller size. Again, the criterion for focusing information on the active area of the photosensor array 16 is to aim the field of view of the reader 12 as identified to the user by the marker indicia, such as the described spots or bars, so as to place the information to be read entirely within the area 45. If the angular alignment of the label 30 is less than that illustrated in FIG. 4, and is disposed at an angle with respect to the illustrated rectangular shape of the active field of view in FIG. 5, the user may simply back the reader 12 away from the surface 40 until the entire information area of the label 30 is contained within the area 45.

An increased distance between the label 30 and the reader 12 results in a smaller image of information being focused on the photosensor array 16. However, like the label 30 shown in FIG. 4, the entire label 30 in FIG. 5 will become focused on the photosensor array 16. The flash illumination by the referred to xenon flash tube 11 may be chosen to allow the "f-stop" of the optics 14 to be stopped down such that the depth of field of the reader is increased to allow the image 20 to become focused on the photosensor array 16 even though the distance between the reader 12 and the supporting surface 40 may vary for example, between two inches to well in excess of one foot. It may further be found convenient to use currently known and available automatic focusing techniques to further increase the ability of the reader to focus the image 20 over a yet further increased range of distances of several feet between the indicia to be read and the reader 12. Such increase in versatility of the reader 12 would result, of course, in a corresponding increase in the cost of the reader.

FIG. 7 illustrates a light source (such as shown at 51 through 54 in FIG. 2), say source 51, more generally identified as light source assembly 55, in combination with a typical molded casing 56 including a lens 57 for linearly expanding the light emitted from the source 51 in one or more directions away from its optical axis 58. Thus, as illustrated in FIG. 5, the light emitted, from the sources 51 through 54 is expanded linearly from center points shown at 59 into two directions disposed at a 180 degree angle.

It may also be possible to change the angle between the two legs 61 and 62 (FIG. 7) from 180 degrees to, for example, a right angle between the two directions of expansion of the emitted light. With such modification, the expansion direction 62 would be directed into the plane or out of the plane of the drawing of FIG. 7. The configuration of marker spots 61, 62, 63 and 64 in FIG. 6 illustrate a right angle expansion of the light emitted through correspondingly configured lenses 57. In the configuration of the marker spots 61 through 64, the corresponding light sources would be located again at the corners of the photosensor array 16, as shown with respect to the light sources 36 through 39, for example.

It would be expected that the intensity of the linearly deflected or expanded light decreases with the distance from the optical center of the non-deflected light beam. Thus, as shown in FIG. 5, the corners of the area delineated by the marker bars 46 through 49 may not be illuminated by the marker bars, while the centers of the sides of the area 45 shown in FIG. 6 may not be illuminated or only slightly illuminated relatively to more brightly illuminated corners by the respective marker spots 61 through 64. FIG. 6 also shows the label 30 disposed entirely within the area 45 delineated by the marker spots 61 through 64.

While FIGS. 4 through 6 show a somewhat rectangular configuration of the marker spots or bars, a square configuration with a correspondingly square configuration of the photosensor array 16 may be preferred. However, the particular shape of the photosensor array 16 and the marked or delineated area 45 are not critical, as long as the area 45 delineated by the marker spots defines the active area 20 disposed in the interior of the reader 12.

As described, a complete label, e.g., five inches high by five inches wide, having a complete bar code, or row or rows of characters thereon or other two-dimensional arrangement, can be focused onto the operative area of a complete image photosensor array, such as 16, in response to a single essentially instantaneous flash of a light source, such as 11. A relatively larger sized label 30 would simply require an operator of the reader to increase the distance between the reader 12 and the label to be read.

In some applications, the height dimension of the complete image area array 16 may be such that a complete area information image including the entire area information width, e.g., of an eighty column line of characters, can be read whether the width of the information image is disposed widthwise or heightwise or diagonally on the photosensor array 16. In general, such area information is focusable on the photosensor array 16 in any angular orientation about the optical axis 25. By way of example, a label 30 containing all its information in an area of square configuration 1.3 inches on a side could be disposed so that its width extended horizontally or vertically or at an acute angle on the photosensor array 16 and in each case the entire contents of the label could be read with a single flash of light source 11.

Preferably the hand-held unit 12 contains batteries "BATTERY" (schematically indicated in FIG. 2 at 65) with sufficient energy so as to supply the flashable light source means 11 and the other components of the hand-held unit, so that the unit is essentially self-contained and free of any connecting cable or the like.

The system of FIG. 2 may be provided with an autofocus ranging system, as already referred to above, so that the reader 12 may have the ability to read at extended distances, e.g., up to forty-eight inches and possibly even greater distances, and may also be capable of reading a wider range of target areas. Autofocus systems are common in 35 mm cameras.

The hand-held reader unit 12 of FIG. 2 may contain the programming to recognize several types of optically discernible indicia of information, such as bar codes as well as conventional character fonts and other two-dimensional information, and to automatically select the appropriate decoding algorithm from those available in its on-board stored program. Alternatively, it could be tailored to a specific application by including only those decoding programs relevant to the code format expected to be encountered. Furthermore, the hand-held unit 12 may contain an area array photosensor 16 of size and resolution so as to register the above-mentioned multiple lines of characters, e.g., eight lines of eighty characters each at one time. Preferably, the entire information field to be instantaneously recorded or read, such as represented by label 30 in FIG. 2, is illuminated simultaneously by a brief flash of highly intense light source such as the xenon tube 11.

The reading of bar codes with a complete area photosensor array such as 16, enables the digital data representing a bar code, for example, to be rotated and otherwise normalized as a complete entity prior to decoding, such that the normalized data may correspond to that obtained by sequentially reading or scanning along a bar code parallel to the longitudinal bar code axis at a multiplicity of levels separated center to center, e.g., by four mils. By combining the corresponding data points at different levels, e.g., on an averaging basis, defects in the bar code image can be reliably overcome such as defects due to foreign matter, spurious marking and the like. Again, the bar code can be disposed at any random angle relative to the reader during the reading operation, speeding the reading of the labels, reducing operator fatigue and increasing the number of labels which can be read during a working day.

FIG. 3 is a simplified functional block diagram showing the photosensor array ("CCD") 16 coupled through typical driver circuits ("BF") 66 and 67 to the analog/logic interface ("A/L INTERFACE") 18. The data signal output from such typical interface circuit 18 would be coupled directly to the above referred-to microprocessor circuit ("MICROPROCESSOR") 19, such as a processor TMS320C31 as provided by Texas Instruments. It is to be understood that other devices may be available and may be substituted therefore. For example, the device 19 may provide 4K words of On-Chip Program ROM and 544 words of programmable On-Chip RAM.

Typically, such minimum ROM (Read Only Memory) and RAM (Random Access Memory) may be supplemented with further programmable memory, such as the memory ("RAM") 21, and with additional read only memory ("ROM") 68. The processor circuit 19 may address and transfer such additional memory by typical address and data buses 69 and 70, respectively. Data may also be transferred to a suitable communication interface ("COMM.INT.") 71, which in turn is coupled to the above referred-to communication link 22, which may be an RF or an optical link. It should be understood that the specifically described elements and their functions are merely for explanatory purposes and various changes may be possible within the scope hereof.

As a further example, FIG. 8, similarly to that shown in FIG. 2, shows the supporting surface 40 with the label 30, such as a stacked bar code, for example, in relationship to the hand-held optical reader unit 12. The reader unit 12 also preferably includes typical optics 14 and a photosensor array 16 disposed in a focal plane at an interior plane or region 15 behind the optics 14. An image 20 of information representative of the information on the label 30 may be formed on the photosensor array 16 when the reader 12 is activated by instantaneously illuminating an area ahead of the reader 12 and hence the supporting surface 40 in the region of the label 30 when the reader optical axis 25 is aimed toward the label 30. The illuminator 11 is generally a flashable xenon tube which may, of course, comprise any number of flash type illuminators 11.

FIG. 8 therefore illustrates an annular illuminator 11 which is comprised of a number of discrete pulsable light emitting diodes 76. The light emitting diodes are preferably disposed adjacent the exterior portion of the optics 14 of the reader 12 in a plane perpendicular to the optical axis 25, substantially similar to the arrangement of the xenon flash tube shown in FIG. 2. The number of discrete light emitting elements 76 may be chosen to correspond to a total light intensity needed to illuminate the exterior region of the label 30. Depending on the desired range over which the reader 12 is to function, the number of discrete devices may be increased by closer spaces between adjacent ones of the light emitting diodes 76.

FIG. 8 illustrates another change in the described arrangement with respect to the previously described marker sources, such as the light emitting diodes 36 through 39 or the light sources 55 including lenses 57 of FIG. 7. Even though it is presently considered advantageous to project beams from the marker sources through the optics 14, within reason it is possible to also project marker spots or bars, such as bars 77, 78, 79 or 80, against the surface 40 from respective marker light sources 81, 82, 83 and 84 without having the projected beams directed through the optics 14 of the reader 12. Thus, the marker light sources 81 through 84 may be disposed externally of the optics 14 and on a frontal portion 85 of the reader 12. The lenses 57 of the light sources 81 through 84 may be disposed to direct the respective marker beams of the light sources substantially along the periphery of the field of view of the optics 14 of the reader 12.

As described with respect to FIG. 7, the lenses 57 may be shaped to linearly shape the emitted light of the marker sources in two mutually opposite directions or at an angle other than 180 degrees, depending on the location of the light sources. A disadvantage may possibly be noticed in that the marker sources are not in total alignment with the periphery of the field of view of the optics 14. Consequently, at extremes of an operating range of the reader 12, resulting marker bars or spots, such as the marker bars 77 through 80 shown in FIG. 8, may not delineate precisely the area 45 which corresponds precisely to the active photosensor array 16 projected against the surface 40 through the optics 14. However, only at close range, the marker spots or bars 77 through 80 may form on the surface 40 somewhat externally of the actual area 45, hence indicating an area larger than one that may be read by the reader 12. When the sources are properly placed, such deviation may be confined to a range at which normally no readings are taken. At a medium range, the marker bars may be disposed to clearly delineate the area 45. Similarly, an area smaller than the actual area 45 may be indicated at an extended distance for reading the label 30. Thus, for practical purposes the marker sources may be oriented such that the predetermined area 45 is bracketed for substantially all readings.

It should be understood that not only light sources for generating the bars 77 through 80 may be disposed externally of the optics 14, but light sources disposed to project marker beams generally to corners of the rectangular area 45 may be disposed externally of the optics 14. Such alternate light sources 86, 87, 88 and 89 may similarly be disposed as closely as feasible adjacent the optics, and actually may be disposed within the annular configuration of flashable illuminator source elements 76, as shown in FIG. 8. With respect to the latter sources, lenses 57 may be disposed to linearly expand the respective marker beams at right angles so as to bracket the area 45 as indicated in FIG. 6, for example. It should be understood that various other changes suggest themselves from the arrangements as disclosed herein.

Figure 10:
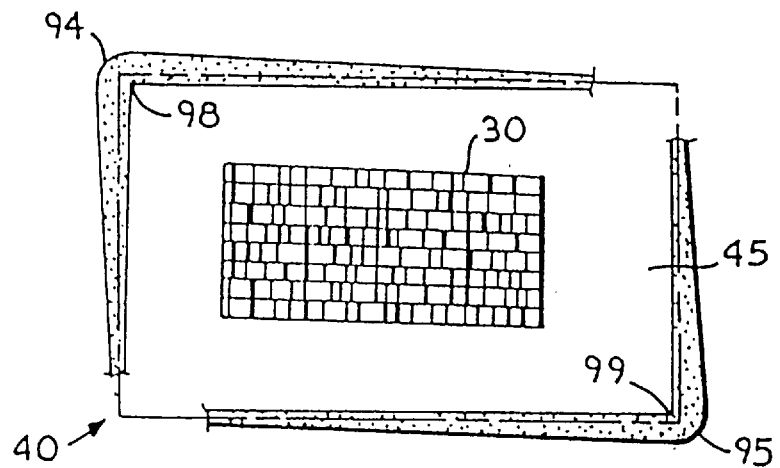
FIG. 10 shows a variation of the embodiment of FIG. 9 for delineating the field of view of the reader, also showing a stacked bar code label encompassed in a horizontal orientation within the delineated field of view.

As an example of changes or variations in delineating the area 45 within the field of view of the reader 12, the marker sources may be advantageously limited in numbers. FIGS. 9 and 10 depict an example of another arrangement of marker sources, the respective impinging marker spots being identified by numerals 92 and 93 in FIG. 9 and by numerals 94 and 95 in FIG. 10. In each of these arrangements, the marker sources are disposed to generate marker beams impinging on the surface 40 as the respective marker spots 92, 93, 94 and 95 with the earlier described right angle expansion from diagonally opposite corners 96 and 97 of the delineated area 45 as shown in FIG. 9, and from corners 98 and 99 of such area 45 as shown in FIG. 10. Also, the orientation of the label 30 depicts a substantially vertical or heightwise arrangement with respect to the area 45 in FIG. 9, and a substantially horizontal or widthwise arrangement of the label 30 with respect to the area 45 in FIG. 10. The different orientations of the respective label 30 in each instance further illustrate the above described advantage of the reader 12 in providing for the capture of an area of information on the photosensor array 16 independent of the orientation of such information about the optical axis 25 of the reader 12.

With respect to the shape of the photosensor array 16, photosensor arrays of the current state of the art are generally of rectangular shape or at least the active areas are of rectangular shape. While the preferred embodiment discloses a generally circular lens or optics 14, the shape thereof is preferred because of the generally rectangular shapes of so-called targets or photosensor arrays 16 of video cameras. It should be understood that the invention in its broad scope may not depend on a sensing area of any particular shape.

The ability to capture and manipulate an entire image with a portable unit has important benefits for optical character reading also. In such instances, a reading area of elongate rectangular shape may be preferred. For example, the described embodiments allow the use of image enhancement algorithms, e.g., of the type developed for enhancement of deep space probe images, as well as image normalization, e.g., such as image rotation and scaling. Non-linear scaling for improving recognition efficiency with respect to irregular surfaces such as curved surfaces, and with respect to off-axis viewing angles as herein described, is also feasible.

Description of FIGS. 11–19

In some applications, it may be desirable to use a hand-held optical reader having a fixed focal length and a general tablet configuration corresponding to that of a Delivery Information Acquisition Device ("DIAD") as utilized by United Parcel Service of America. Referring to FIG. 11, for example, a matrix-type two dimensional photosensor may be used (such as the sensor 20 of FIG. 2) and may have a field of view delineated by the marginal lines 100, 101 and the reader 12 having a focal length of approximately 8.5 inches from a window 102 thereof and a depth of focus of approximately±2 inches. In that event, positioning of the reader 12, as described in connection with FIGS. 11, 12a–12d, 13 and 14, becomes substantially more critical. For such applications, the present invention provides a marker beam source means corresponding to at least one of the light sources 52, 53 in FIG. 2, (for example, light sources 104 or 105 as shown in FIG. 11) wherein the respective beam 107 or 108 converges toward the optical axis 25. As the reader 12 is moved toward the supporting surface 40, to a location closer to the supporting surface 40, the relative position of the supporting surface may be at the phantom line indicated by the numeral 110 in FIG. 11, so that a marker spot 112 or 113 cast on the supporting surface 40 is spaced farther from the optical axis 25 than the corresponding marker spots 115 and 116 for the supporting surface located as shown by the solid line 40.

As an example of the arrangement shown in FIG. 11, assume the arrangement illustrated therein is incorporated into a DIAD reader of tablet configuration having a focal length of 8.5 inches and a viewing area of 6.5 inches wide by 4.0 inches high. For example, if the dashed lines 100, 101 of FIG. 11 represent the margins of the field of view in the width direction of the window 102, then the distance between surface points 100A, 100B would be 6.5 inches when surface 40 is spaced 8.5 inches from the reader.

Figure 12A:
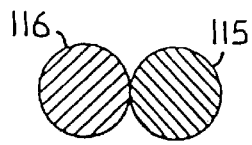
FIG. 12a–12d show schematic representations of the relationship of marker spots cast on the target area as the spacing between the optical reader and the target area is varied.

In FIG. 11, the light sources 104 and 105 are shown at the margins of the wide dimension of the window 102. Assume that both of the light sources 104 and 105 are operative and the resultant beams 107 and 108 therefrom converge toward each other and toward the optical axis 25 such that the marker spots 115 and 116 touch each other as the reader 12 is spaced at the optimum focal distance from the supporting surface 40, such as at 8.5 inches. At the optimum focal distance, the marker spots may then appear as shown in FIG. 12a.

Figure 12B:
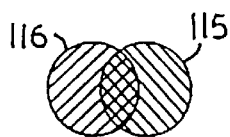
Figure 12C:
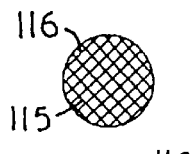
Figure 12D:
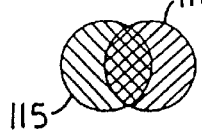

Now assume that the reader 12 is moved farther away from the supporting surface 40. In this circumstance, the marker spots 115 and 116 may overlap, as shown in FIG. 12b. If the reader 12 is moved even farther away from the supporting surface 40, a distance will be reached whereby the marker spots 115 and 116 coincide as shown in FIG. 12c. Similarly if the reader 12 is moved closer than the optimum focal distance from the supporting surface 40, the marker spots 115 and 116 will move apart. In other words, it would be visibly obvious to a user of the present invention, by observing the relationship between the two marker spots 115 and 116, to know which direction the reader 12 must be moved relative to the supporting surface 40 in order to bring the target area 45 into optimum focus.

In some applications it may be preferable to adjust the convergence of the beams 107 and 108 such that the marker spots 115 and 116 coincide, as shown in FIG. 12c, as the reader 12 is spaced at the optimum focal distance from the supporting surface 40. In that event, the overlapping relationship shown in FIG. 12b would exist as the reader 12 is spaced closer than the optimum focal distance from the supporting surface 40, whereas the overlapping relationship shown in FIG. 12d would exist as the reader 12 is spaced farther than the optimum focal distance from the supporting surface 40.

For such an application, it may be preferable to use light sources which cast colored marker spots 115 and 116, e.g., red and blue, such that the switching in positions of the colored marker spots 112 and 113 would indicated that the reader 12 has been displaced through the optimum focal distance from the supporting surface 40.

As an example of the size of the marker spots 115 and 116, if the spots 115 and 116 have a diameter of approximately ¼ inch at the window 102, then those spots, may have a maximum dimension of approximately ½ inch at a distance of approximately 10 inches from the window 102. As a result, the marker spots 112 and 113 are easily visible to a user of the reader 12.

If the reader 12 is being used such that the optical axis 25 is substantially perpendicular to the supporting surface 40, the view of the marker spots 115 and 116 from a user's eye located at 118, as shown at FIG. 11, may be somewhat obstructed by the reader 12. As a result the user may need to position his head somewhat to the side of the reader 12 in order to see the relationship of the marker spots 115 and 116 on the supporting surface 40. If, however, the reader 12 is of the type shown in FIG. 15 that reads at an oblique angle, then the user can view the marker spots 115 and 116 without obstruction from the reader 12 by sighting past the front edge of the hand-held unit 12.

Figure 13:
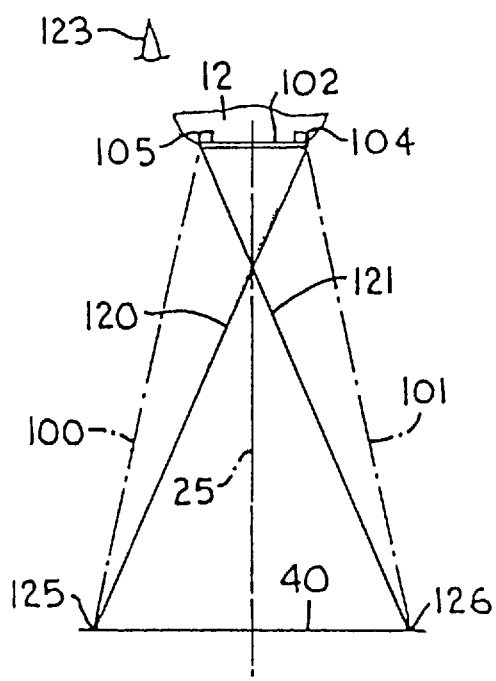
FIG. 13 shows a pair of marker beams crossing the optical axis between the optical reader and the target area, according to the present invention.

Referring to FIG. 13, for those applications wherein the reader 12 is used with the optical axis 25 directed substantially perpendicularly to the supporting surface 40, the light sources 104 and 105 may be arranged whereby the respective beams 120 and 121 therefrom converge toward and cross over the optical axis 25 at a distance from the window 102 which is less than the preferable focal length of the reader 12. Thus, a viewer having an eye located at 123, as shown at FIG. 13, has an unobstructed view of a marker spot 125 cast by the light source 104. In that event, the user can sight along the side of the reader 12 to determine whether the location of the marker spot 125 corresponds with the marker spot position normally observed as the reader 12 is spaced at the optimum distance from the supporting surface 40.

Assume a terminal unit 150 is positioned parallel to the target surface as in FIG. 15. If the marker spot 125 of FIG. 13 is too closely spaced to the vertical plane including the central longitudinal axis of the handheld unit (which coincides with the optical axis 25 in FIG. 13), that indicates to the user that the reader 12 must be moved farther away from the supporting surface 40 causing the marker spot 125 to move outwardly to the relative spacing normally observed at the optimum spacing of the reader 12 from the supporting surface 40. Similarly, if the user observes that the marker spot 125 is spaced too far outwardly from the longitudinal central plane relative to the spacing normally observed as the reader 12 is properly spaced from the supporting surface 40, then it is obvious that the reader 12 should be moved closer to the supporting surface 40 in order to realize the optimum focal distance for the reader 12.

In the example just described, only one of the light sources 104 and 105 is required. The DIAD device hereinbefore mentioned has an arrangement whereby the light sources 104 and 105 can be individually operated such that each of the light sources 104 or 105 can be separately used, such as using one of the light sources 104 or 105 for left-handed operation and using the other one of the light sources 105 or 104 for right-handed operation. By using only one light source in those situations, the energy drain on the portable power supply of the reader 12 can be substantially reduced.

It is to be understood that an application of the invention as indicated in FIG. 13 may be arranged whereby the marker spots 125 and 126 may be cast either inside or outside of the field of view delineated by the marginal lines 100, 101.

For some applications it may be desirable to use a label with a bullseye. The bullseye may have any configuration such as that described in U.S. Pat. No. 4,896,029, issued 23 Jan., 1990 to Chandler, et al. In that event, the bullseye may be comprised of concentric rings having an outer diameter of approximately eight millimeters and may be disposed at the center of the label. For those applications using a bullseye and one of the marker beams 107 or 108 of FIG. 11, marker spot 115 or 116 may be utilized not only to position the reader 12 at the appropriate distance from the supporting surface 40, but may also be used to aim the optical axis 25 of the reader 12 appropriately relative to the target area 30 by manually moving the reader 12 such that the marker spot 115 or 116 is superimposed on the bullseye.

Similarly, one of the readers 12, as disclosed herein, having two marker beams 107 and 108 directed such that both of the marker spots 115 and 116 are cast on the supporting surface 40, may be utilized to not only properly space the reader 12 relative to the supporting surface 40, but may also be used to position the reader 12 relative to the label 30 by placing the marker spots 115 and 116 over the bullseye, or one at each side thereof as desired.

Figure 14:
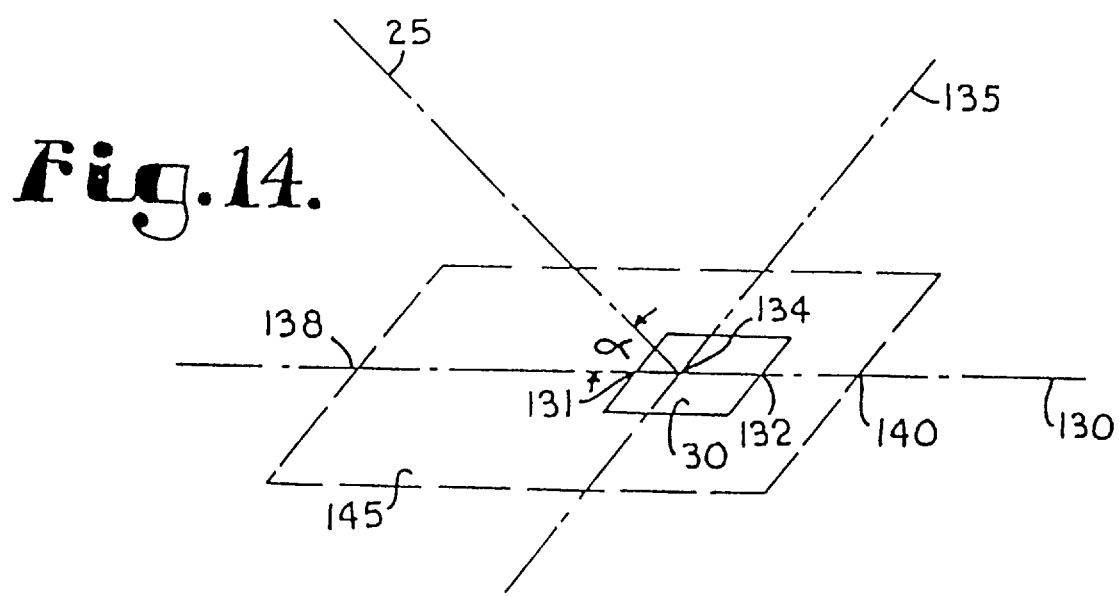
FIG. 14 illustrates a label containing coded information and positioned within the field of view of an optical reader and oriented obliquely to the optical axis of the reader.

The primary emphasis of the present invention involves oblique reading of two dimensional coded information. FIG. 14 depicts this type of reading orientation. In FIG. 14, assume that the optical axis 25 lies in the plane of FIG. 14 and that the label 30 lies in a plane normal to the plane of FIG. 14. Also assume that the label plane intersects the plane of FIG. 14 at the horizontal axis 130 and that the plane containing the label 30 being read forms an angle α of about forty-five degrees to the optical axis 25. Further assume that a leftmost point 131 and a rightmost point 132, located at the intersection of the axis 130 with the margins of the label, are disposed within the field of view 145 and within the depth of focus of the optical reader.

FIG. 15 depicts a terminal unit 150, positioned parallel to the label plane, for obliquely reading the label 30. In FIG. 15, the optical axis 151 is not normal to the major plane of the terminal, but is directed obliquely to such major plane so as to read a label 30 that is offset from the front edge 150a of the reader. This will give the operator a clear view of the portion of the label lying within the field of view when the eyes of the operator are located, for example, at a region such as indicated at 152 above the front portion of the terminal unit. The plane of FIG. 15 may correspond to the central longitudinal plane of the reader 150, while FIGS. 11 and 12 are in planes transverse to the central longitudinal plane of the reader. The rays to the fore and aft margins of the label 30 in FIG. 15 are represented by lines 154 and 155.

Figure 16:
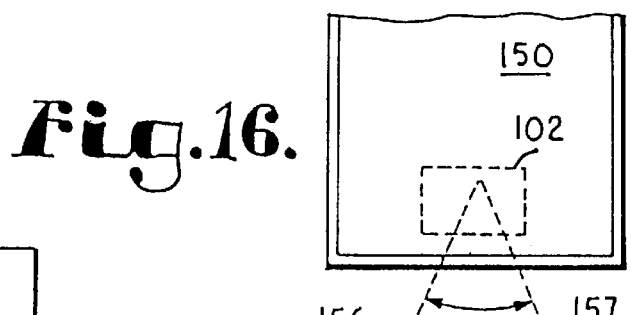
FIG. 16 shows a top plan view of a terminal unit using an oblique optical axis for reading a coded label.

FIG. 16 depicts, from a different perspective, a terminal unit with an oblique optical axis, as in FIG. 15, for reading a coded label 30. The field of view as represented by marginal rays 156 and 157 permits reading a lengthy one dimensional bar code 158 in addition to reading two dimensional codes. FIG. 16, which is a top plan view, illustrates that oblique reading permits the operator to view the coded label without interference from the terminal unit. This capability should result in increased ease of use and enhanced system efficiency.

Assume, in FIG. 15, that the angle a between the optical axis 151 and the label plane is forty-five degrees. Assume that the intersection point 134 is 8.5 inches from the optical reader. Also assume the label 30 is one inch by one inch square.

In such circumstances, the leftmost point 131 of the label 30 is 8.15 inches from the terminal unit. The angle β between the ray path 155 to the leftmost point 131 and the label plane is 47.49 degrees. Likewise, the rightmost point 132 of the label is 8.86 inches from the terminal unit and the angle θ between the ray 154 to the rightmost point 132 and the label plane at the rightmost point 132 is 42.71 degrees.

Consequently, for a given label 30, the distance between the terminal unit and a point on the label varies as a function of point position. The reading angle also varies as a function of position. These variables create distortion and reading problems that the present invention is designed to overcome.

FIG. 17 depicts the field of view and depth of field for a terminal unit 150 having a four inch field of view 170 perpendicular to the optical axis 151 point 171 that is 8.5 inches from the imaging system. The angle at a point 171 between the label plane 172 and the optical axis 25 is forty-five degrees. The field of view intersects the target surface at the label plane 172. The label plane 172 is perpendicular to the plane of FIG. 17. In this example, six inches of the target surface is within the field of view of the imaging system.

Assume that the imaging system of the terminal unit 150 has a depth of field from 6.5 inches to 10.5 inches. In such circumstances, the portion of the label plane that is within the field of view of the reader and is also between the leftmost point 173 and the interior point 174, is within the depth of field of the imaging system. The portion of the label plane between the interior point 174 and the rightmost point 175, however, is not within the imaging system's depth of field even though it is within the field of view. Any point between the interior point 174 and the rightmost point 175 is more than 10.5 inches from the imaging system.

For applications where a label is read using an imaging system with a uniform pixel density and an optical axis oriented obliquely to the target area 45 and orthogonally to the imaging system, the image received by the imaging system will be skewed or distorted. Referring to FIG. 14, any point on a label 30 and an axis 135 (referred to herein as the baseline or undistorted axis) perpendicular to the optical axis 25, such as point 134, appears just as it would if the label had been orthogonal to the optical axis. On the other hand, coded information displaced from the baseline 135, such as between the points 131 and 134, and between points 132 and 134 on the axis 130 is at various depths and angles from the reader. For orthogonal reading, all such points would be approximately at the same distance from the reader. The oblique angle of the optical axis results in a foreshortening of the respective spacing of the label's coded information.

Assume that a terminal unit is positioned to read a label oriented in the manner illustrated in FIG. 15. If the optical reader 150 has an area image sensor containing a uniform pixel density over its entire sensing surface and if that image sensor is oriented orthogonally to the optical axis 25, the label image formed on the photosensor array, for the reasons stated above, will exhibit distortion. The magnitude of the overall distortion is dependent upon the angle α of the optical axis 25 to the label 30. The smaller the reading angle α of FIG. 15 is, the greater the resultant distortion. In addition, the distance of the label from the reader is dependent upon the positioning of the label 30 within the field of view 45 of the optical reader 12.

An optical reader 12 with its optical axis 25 arranged perpendicularly to the target area 45, as in FIG. 2 for example, may have a uniform magnification of ten-to-one over the received image. As the reader 12 is being used for oblique reading, the resulting distortion can be corrected in several ways. A lens system can be tailored to A) increase the magnification of the received image to greater than ten-to-one along the image axis corresponding to the distorted object axis 130, FIG. 14, while maintaining the magnification at ten-to-one along the image axis corresponding to the undistorted object axis 135, B) maintain the magnification at ten-to-one along the image axis corresponding to the distorted object axis 130 while decreasing the magnification to less than ten-to-one along the image axis corresponding to the undistorted object axis 135, or C) increase the magnification to greater than ten-to-one along the image axis corresponding to the distorted object axis 130 while decreasing the magnification to less than ten-to-one along the image axis corresponding to the undistorted object axis 135. The relative changes in magnification are dependent upon the correction method used, the oblique reading angle used and the spacing of the label 30 or other coded information within the field of view of the optical reader.

Alternatively, the orientation and configuration of the invention's imaging system can eliminate the distortion caused by the oblique viewing angle. Proper orientation of the image sensor relative to the optical axis will compensate for the oblique orientation of the label. Likewise, a proper configuration of the image sensor's resolution will perform the same task.

Figure 18:
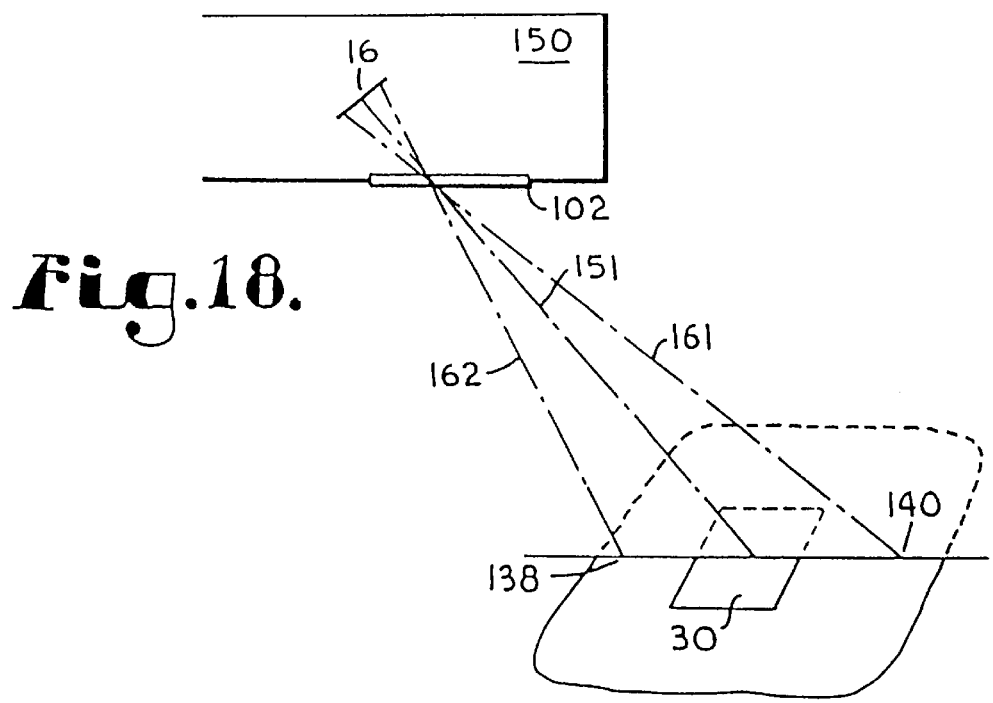
FIG. 18 is a schematic representation of an optical reader using a rectilinear matrix-type image sensor positioned orthogonally to an optical axis that is oblique to the major plane of the reader and containing (as represented in FIG. 1A) a greater density of sensing elements, or pixels, in the vertical direction than in the horizontal direction.

An image sensor 16 containing a vertical pixel density exceeding its horizontal pixel density effectively modifies the height-to-width ratio of the received image to better represent the actual height-to-width ratio of the label 30. Preferably, the height-to-width ratio of the corrected image is similar to that of the label 30. FIG. 18 illustrates this method of distortion correction. This configuration permits orthogonal orientation of the image sensor 16 to the optical axis 151.

For some applications, it is unnecessary to obtain an image with a height-to-width ratio exactly equal to that of the coded information or label For those cases, it is only necessary to enlarge the received image along the image axis corresponding to the distorted object axis 130 of the obliquely viewed label. Accurate reading of the coded information is then possible.

Figure 19:
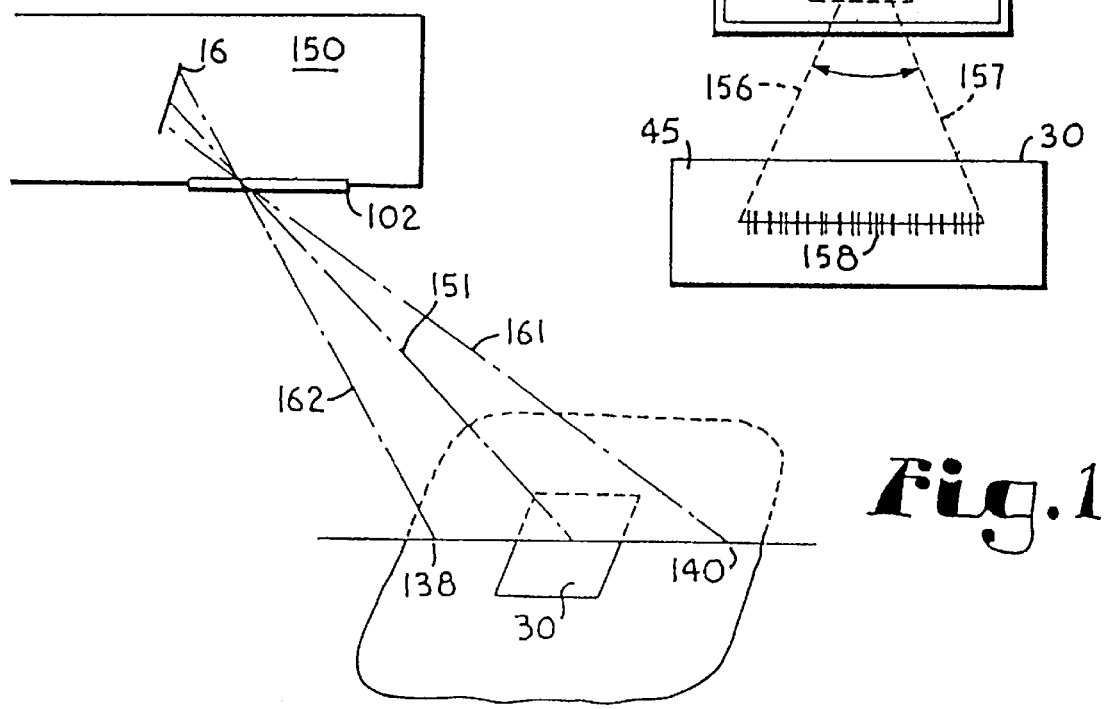
FIG. 19 is a schematic representation of an optical reader using an image sensor positioned obliquely with respect to the optical axis and containing a uniform density of sensing elements or pixels in the vertical and horizontal directions. The angular orientation of the sensor in this embodiment compensates for the distortion which may result from viewing a label at a given oblique angle.

As noted, another correction method involves oblique orientation of an image sensor. This method is illustrated in FIG. 19. Positioning the image sensor on the focal plane of the received image 20 eliminates oblique reading as a significant distortion source.

Preferably, the optical axis intercepts the central region of the coded information. Additional distortion, caused by spacing the coded information nearer the rear of the field of view, is thereby avoided. Distortion variation within the image, resulting from portions of the coded information being nearer the rear of the field of view than other portions, is minimized.

For example, reading with the optical axis at an oblique angle of forty-five degrees to the target surface is within the scope of the present invention, However, reading at a thirty degree angle provides an image with a reduced depth variation. Reading at a smaller angle causes portions of the coded information to be nearer the rear of the field of view.

It is to be understood that the actual height-to width ratio of the label 30 or other two-dimensional coded information, such as the above-mentioned bullseye, may be included as an integral part of the coded information. In that event, such ratio would be designed so that it could be accurately read without correction at any angle of obliqueness within the range of oblique reading angles available to a particular optical reader. The associated componentry of the optical reader 12, having read and processed the ratio information, can then be utilized to automatically correct for the oblique distortion as herein described.

Focusing by use of ranging marker beams, which can be readily combined with the obliqueness correction of the present invention, is described above and will not be reiterated here in detail. In addition, automatic focusing techniques, which are well-known in the art, can be readily combined with the various described embodiments.

Furthermore, illumination and reading means utilizing light of various wavelengths can be used in conjunction with the present invention. A method and apparatus for using variances in light wavelength to read optical information over a substantial range of distances is disclosed in U.S. Pat. No. 5,359,185, dated 25 Oct., 1994, by inventor George E. Hanson. The disclosures of U.S. Pat. No. 5,359,185 are hereby incorporated, in their entirety, by this reference.

The reader 12 of the present invention may be configured to compensate for distortion due to an oblique reading angle as data is read from the photo sensor array 16. The reader 12 adjusts the captured data based upon "correction parameters" that relate the captured data boundary properties to expected data boundary properties. The correction parameters upon which data is adjusted or altered may be determined either from the captured data itself or from previously captured data. When previously captured data is used to determine correction parameters, the reader 12 must determine that the correction parameters determined from previously captured data are valid for the current capture cycle. The reader 12 may determine that the correction parameters are valid for the present capture cycle by determining that the time lapse between the capture cycle for which the correction parameters were determined and the current capture cycle does not exceed a maximum duration of. Alternatively, the reader 12 may determine that previously determined correction parameters are valid for the current capture cycle by determining that the reader 12 is in a nearly identical position relative to a target. When the positions differ beyond a threshold, the previously determined correction parameters may not be used.

In determining the correction parameters, the reader 12 determines the boundaries of the two-dimensional coded image contained within captured data (either a previously captured coded image or the currently captured coded image). Determining boundaries of coded images within captured data is known. Once these boundaries are determined, a dimension ratio, i.e. height versus width, of the captured coded image (i.e. two dimensional coded) is compared to an expected dimension ratio for the coded image. Expected relative dimension ratios may be set by a user, be contained within memory of the reader 12 or may be contained within a captured coded image. Captured coded images may be partially decoded to determine an expected relative dimension ratio for the coded image. In the case of a two-dimensional coded image such as a stacked bar-code, a relatively small portion of the image may be decoded to extract the expected dimension ratio.

Actual boundaries of captured coded images, once determined by the reader 12, may be used to make a threshold determination of decodability. In any read and decode operation, if the oblique reading angle exceeds an oblique angle threshold, the reader 12 may determine that a successful decode is unlikely and signal the user to reposition the reader 12 and capture another image. Further, based upon the relative boundaries, the reader 12 may determine in what fashion the reader 12 should be repositioned to obtain a decodable image. The reader 12 could then notify the user to reposition the reader 12 in such a fashion.

The correction parameters determine how captured data must be adjusted to produce a corrected image that has proper relative boundary dimensions. For example, if a captured coded image has a height to width ratio that is ten percent too small, the height, the width, or both the height and width of the captured coded image must be adjusted prior to decoding to place the captured coded image into a proper ratio. Likewise, if the width of a captured coded image is ten percent wider at the top of the image than at the bottom of the image, the width of the image must adjusted along its height so that the corrected image has a consistent width along its height. Further, if the height of a captured coded image is less at one side then the other side, the height must be adjusted to produce a corrected image with a consistent height across its width.

Thus, the correction parameters, when applied to the captured coded image both "square" the captured coded image and correct the relative height and width dimensions of the captured coded image to produce a corrected coded image. Upon the capture of an image by the photo sensor array 16, the reader 12 determines, or has previously determined, in what fashion the captured coded image must be corrected. The reader 12 uses the correction parameters to determine in what fashion each row of data extracted from the photo sensor array 16 must be adjusted to produce a corrected coded image.

Upon the extraction of each row of data from the photo sensor array 16, the reader 12 adjusts the row of data to produce a corrected row of data. Such correction may include reducing the dimensions of the row of data by reducing data points in the row, expanding the dimensions of the row of data by adding data points to the row and adjusting individual data points within the row of data. Within the captured coded image, different rows will be operated upon differently depending upon their particular position within the captured coded image. For example, an image having a ten percent greater width at its lower portion than its upper portion will be progressively widened from its lower portion to its upper portion so that its upper portion is widened by ten percent to produce a corrected image with a consistent width.

The reader 12 also adds or deletes rows of data to increase or decrease the height of the captured coded image to produce the corrected coded image. Portions of rows of data may be operated upon to correct the height of one portion of the captured coded image but to leave the height of another portion of the image unaffected. In the correction of laterally skewed images, operations of this type are required to create a corrected image having proper relative dimensions and squareness.

Thus, the reader 12 may operate on each row of data separately as it is extracted from the photo sensor array 16 to produce corrected data. The reader 12 adds rows, deletes rows or modifies rows as required by the correction parameters. Such operation is performed prior to decoding and prior to loading the data into memory. Thus, a loading cycle is saved by performing this correction prior to loading the data into memory instead of correcting the data at a later time. Because corrections may require relatively few data point corrections as compared to the number of data points being read from the photo sensor array 16, resources are conserved while still producing corrected images that are more likely decodable.

Figure 20:
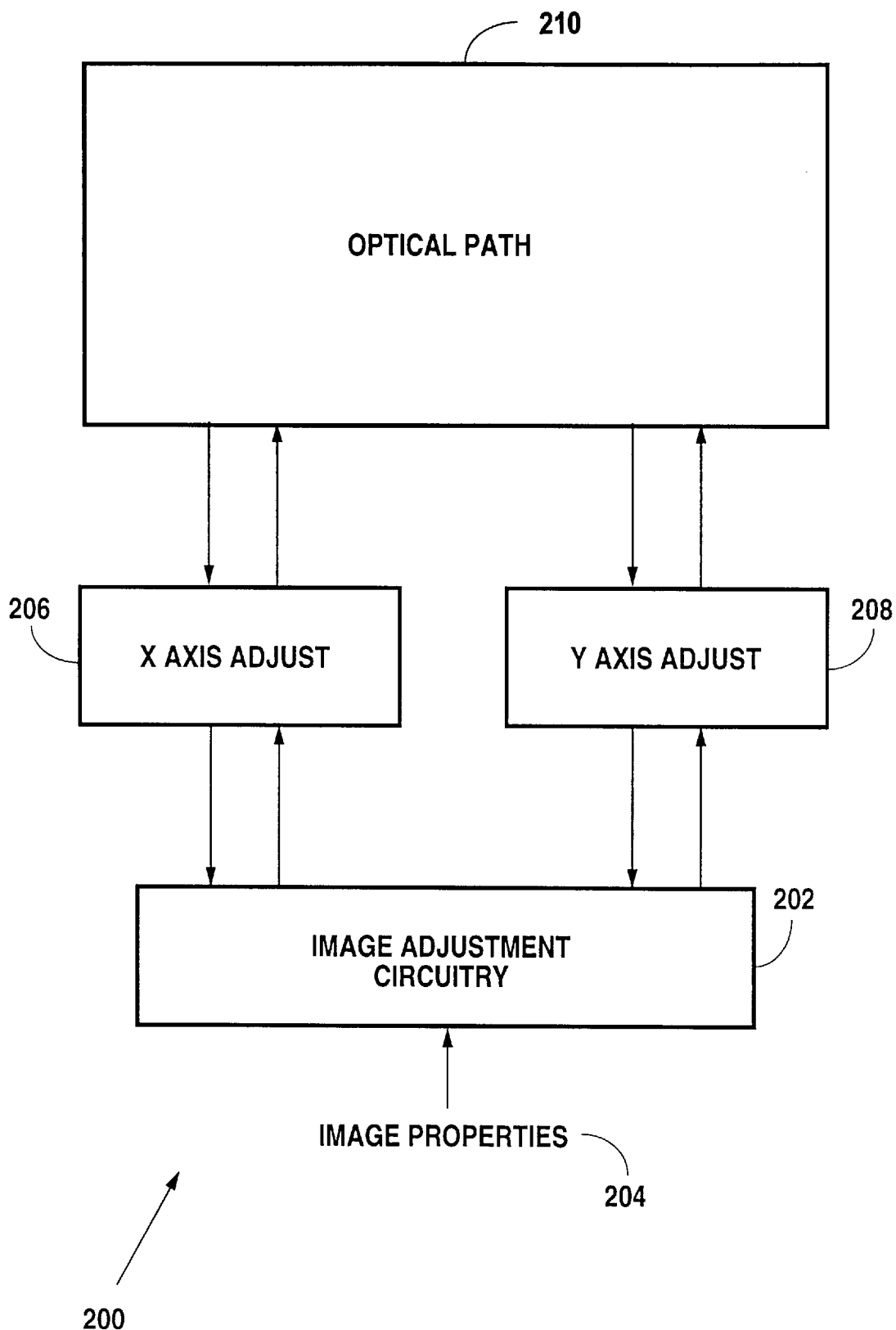
FIG. 20 is a block diagram illustrating optical path components operable to adjust optical behavior of the reader 12 to compensate for an oblique viewing angle.

FIG. 20 illustrates an optical system 200 that compensates for oblique reading angles. The optical system 200 includes image adjustment circuitry 202, an x-axis adjust 206, a y-axis adjust 208 and an adjustable optical path 210. The adjustable optical path 210 may include a lensing system, image adjusting components and/or photo sensor array adjusting components. The lensing system receives reflected light from a coded target and focuses the reflected light. The image adjusting component receives the focused reflected light from the lensing system and adjusts the height and width of the focused reflected light to compensate for an oblique reading angle. The photo sensor array adjustment components adjust the relative position of the photo sensor array 16 with respect to the lensing system and image adjusting component to compensate for the oblique reading angle.

The image adjustment circuitry 204 receives image properties 204 and, based upon the image properties 204, adjusts the optical path 210 via the x-axis adjust 206 and y-axis adjust 208. The image properties may include, among other things, the boundaries of a captured coded image, expected or desired boundaries of the captured coded image, height to width ratio of the captured coded image, expected height to width radio of the captured coded image, variations in width versus height and variations in height versus width. Image properties most typically are determined from a captured coded image that was recently captured by the reader 12 when in an identical orientation and position relative to a coded target. A partial capture cycle may be performed by the reader 12 to determine the boundaries of the captured coded image prior to initiation of a full capture and read cycle.

Based upon the boundary determination and an expected boundary of the captured coded image, the reader 12 determines the image properties 204 and, in turn, determines in what fashion reflected light must be adjusted to produce a correctly ratioed, relatively dimensioned and absolutely dimensioned image upon the photo sensor array 16. Based upon the relative adjustments, the optical path 210 operates to alter the relative dimensions of reflected light from a coded target to produce an optical image on the photo detector array 16 that the photo detector array 16 converts into a captured coded image. In this fashion, the optical system 200 compensates for oblique reading angles by adjusting the reflected light received from the target prior to its conversion into a captured coded image.

Figure 21A:
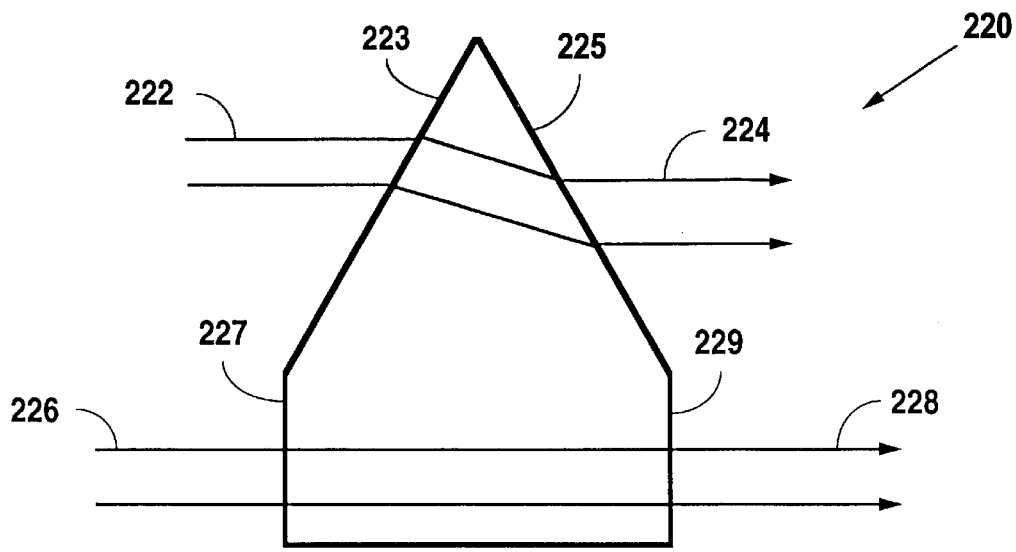
FIGS. 21a, 21b and 21c illustrate optical path components that may be employed to adjust optical properties of the reader 12.

FIG. 21a illustrates an adjusting component 220 that may be used in conjunction with the optical system 200 of FIG. 20. The image adjusting component 220 typically comprises one portion of the optical path 210 of FIG. 20. As previously discussed, other components of the optical path 210 include lensing systems and adjustments to the photo sensor array 16. The image adjusting component 220 comprises optically transparent material that has differing optical properties than the surrounding atmosphere. Glass or another transparent material would serve to provide the desired optical properties when formed in the shape shown.

The image adjusting component 220 has a prismatic shape with surface 223 receiving light to be spread 222 and surface 225 producing spread light 224. Surface 227 receives light that is not to be spread 236 which is passed from surface 229 as light 238 having optical properties identical to the light not to be spread 236, Preferably, the image adjusting component 220 locates at a focal point within the optical path 210 of the system 200 so that optical properties of the image adjusting component 220 may be varied with small physical movements of the image adjusting component 220. Further, by locating the image adjusting component 220 at or near the focal point, the component 220 has a greater working range.

Received light 222 enters surface 223 and is refracted. Due to the shape of the image adjusting component 220, the refracted light is again refracted at surface 225 and exits the component 220 as the spread light 224 in a direction substantially parallel to the path of the received light 222. Due to the prismatic operation of the image adjusting component 220, the spread light 224 is spread with respect to the received light 222. The relative spreading caused by the image adjusting component 220 depends upon the entry point of the received light along surface 223. Greater path length within the image adjusting component produces greater spreading. Thus, by positioning the image adjusting component 220 with respect to received light 222, the image adjusting component produces a controlled spreading of the received light 222 to produce the spread light 224. The image adjusting component 220 therefore is positioned by the x-axis adjust 206 and y-axis adjust 208 to produce spread light 224 with particular spread properties to compensate for an oblique reading angle.

The image adjusting component 220 has a working range within which it may receive light so that spread light 224 does not exceed working boundaries on surface 225 (the point at which surface 225 meets surface 229). This working range depends upon the physical size of the image adjusting component 220, its material properties that determine its index of refraction and the position of the image adjusting component 220 within the optical path. Because the width of the received light 222 determines, in part, the physical width of the spread light 224 (as well as the position of entry of the received light on surface 223), locating of the image adjusting component 220 at a focal point of the optical path enables the image adjusting component to produce a widest possible spreading range. By having a large spreading range, the optical path 210 may be adjusted to account for a wide range of oblique reading angles.

By moving the image adjusting component 220 up or down with respect to the received light 222, the relative amount of spread caused by the image adjusting component 220 is varied. Spreading causes dimensions of a viewed image to be altered. Of course, the working range of the image adjusting component 220 limits the range of operation. Thus, received light 222 may be spread to increase an apparent vertical or horizontal dimension of reflected light from a coded target. Depending upon the positioning of the image adjusting component 220, the apparent height, apparent width or a combination of the apparent width and width of the reflected light from the coded target may be adjusted to compensate for oblique reading angles.

As opposed to x-adjust and y-adjust control of the position of the image adjusting component 220 angular and radial positions could be employed in positioning the image adjusting component 220. The reader 12, based upon the boundaries of a captured coded image determines the relative angular position of the top of a coded target with respect to the top of the reader 12 as well as the oblique reading angle. Based upon the relative angular position and the oblique reading angle, the reader 12 adjusts the position of the image adjusting component to correspond to the angular position and oblique reading angle. The image adjusting component 220 then compensates for the oblique reading angle at the correct angle of view of the coded target.

In some operations, the reading angle is not oblique and no correction is required. Thus, the image adjusting component 220 includes surfaces 227 and 229 that are parallel to one another. The image adjusting component 220 may be positioned so that light entering through surface 227 is not altered and exits surface 228 without being adjusted.

Figure 21B:
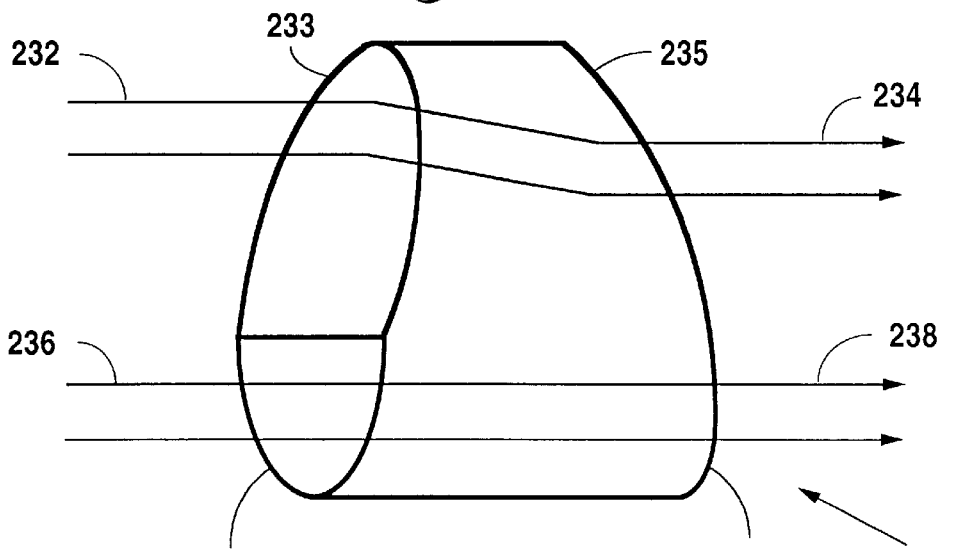

FIG. 21b illustrates an alternative image adjusting component 230 formed from a section of a transparent rod. The image adjusting component 220 of FIG. 21a had a substantially prismatic shape, altered to form surfaces 227 and 229. The image adjusting component 230 of FIG. 21b, however, has the outer shape of a rod with surface 233 formed at an angle with respect to surface 235. Light 232 to be spread is refracted at surface 233 and surface 235 to produce spread light 234 substantially parallel the light 232 to be spread. Parallel surfaces 237 and 239 allow light received at surface 237 to pass through the body of the image adjusting component 230 without being refracted and to exit surface 239 without being refracted. Thus, light 238 exiting surface 239 is identical to light entering surface 237. The image adjusting component 230 may be positioned to adjust the amount of spread created and to simply pass transmitted light.

Figure 21C:
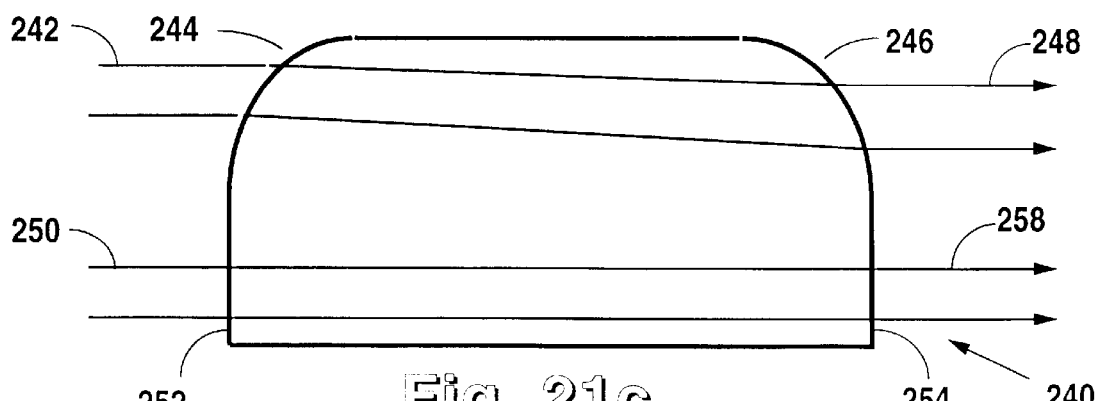

FIG. 21c illustrates still another image adjusting component 240 that could be used in conjunction with the present invention. The image adjusting component 240 includes a rounded receiving surface 244 that receives light 242 and refracts the light into the component 240. This refracted light then exists the component 240 at surface 246 as spread light 248. Depending upon the position of the component 240, received light 242 is spread a certain amount. The image adjusting component 240 also includes surfaces 242 and 254 that are parallel in orientation. Received light 252 enters the image adjusting component normally to the surface 252, passes through the component 240 and exits the component 240 through surface 254 without refraction. Thus, exiting light 254 is the same as entering light 252. The image adjusting component 240 may be positioned within an optical path in the reader 12 to adjust reflected light as is required to compensate for an oblique reading angle.

Figure 22A:
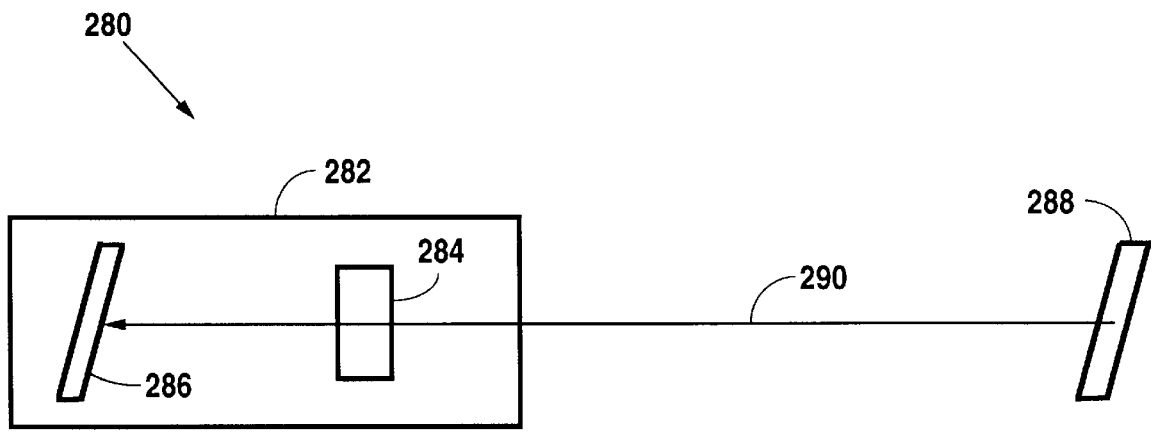
FIGS. 22a and 22b illustrate an adjustable photo sensor array positionable to compensate for an oblique viewing angle.

FIG. 22a illustrates an adjustable optics 282 that may comprise all or a portion of the adjustable optical path 210 of FIG. 20. The adjustable optics 282 receive reflected light from a target 288 along a reading axis 290. As is shown, the reading axis 290 is at an oblique angle relative to a flat surface of the target, the angle considered the oblique reading angle. The adjustable optics 282 compensate for this oblique reading angle.

The adjustable optics 282 include an optical component 284 and an adjustable photo detector array 286. The optical component 284 includes a lensing system that focuses reflected light received along the reading axis 290 onto the adjustable photo detector array 286. The optical component 284 may also include an image adjusting component as was previously described with reference to FIGS. 21a, 21b and 21c.

The adjustable photo detector array 286 has an adjustment mechanism that is controlled to orient the adjustable photo detector array 286 with respect to the reading axis 290 in the same manner as the target 288 is oriented with respect to the reading axis 290. Alignment circuitry contained within the reader 12 views the boundaries of a captured coded image of the target 288 to determine the orientation of the target 288 with respect to the reading axis 290. The alignment circuitry then aligns the photo detector array 286 with respect to the reading axis 290 so that it orients in an identical fashion. By placing the adjustable photo detector array 286 in an identical orientation with respect to the reading axis 290, distortion caused by the oblique reading angle is corrected fully.

In some operations, the adjustable photo detector array 286 may have insufficient range of motion to compensate fully for an oblique reading angle. In that case, the optical component 284 partially adjusts the reflected light prior to exposing the adjustable photo detector array 286 with the light. Alignment circuitry operating within the reader 12 positions the adjustable photo detector array 286 and operates the optical component 284 to fully compensate for the oblique reading angle.

Figure 22B:
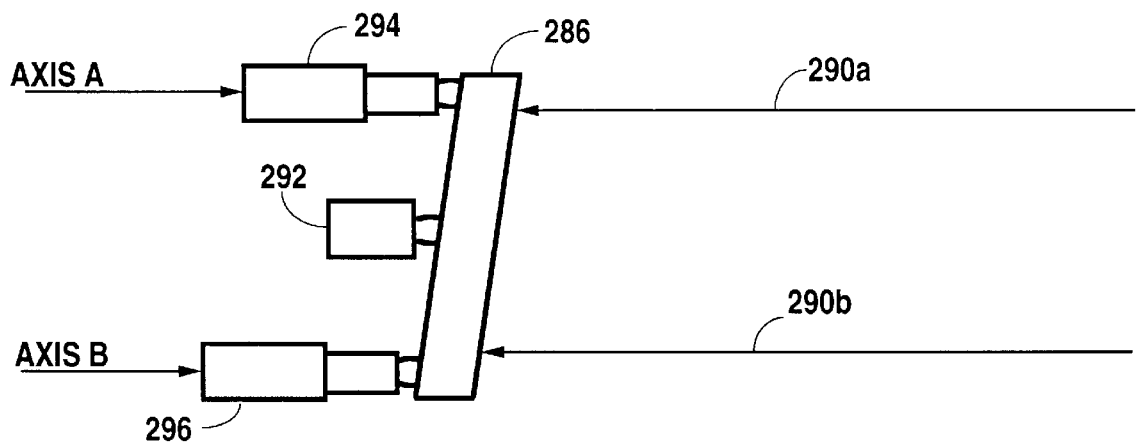

FIG. 22b illustrates one embodiment of an adjustment mechanism for positioning the photo detector array 286 to compensate for an oblique reading angle. The adjustment mechanism includes a pivot 292 connected at a first end to a central portion of the adjustable photo detector array 286. A-axis positioner 294 connects at a first end to an upper near side of the back of the photo detector array 286. B-axis positioner 296 connects at a first end to a lower near side of the back of the photo detector array 286. Second ends of the pivot 292, the A-axis positioner 294 and the B-axis positioner 296 attach firmly to a frame of the adjustable optics 282. Both the A-axis positioner 294 and the B-axis positioner 296 are extendible to vary the length of the positioners. Because of their connections to the photo detector array 286 and their positions with respect to the pivot 292, the orientation of the photo detector array 286 with respect to the reading axis 290 may be precisely controlled along two axes by controlling the lengths of the positioners 294 and 296. As illustrated, the photo detector array 286 may be positioned such that reading axis portion 290a is nearer the target than reading axis portion 290b, the relative distances compensating for the oblique reading angle.

A-axis positioners 294 and 296 may comprise screw-type extenders operable by electric motor control, solenoids whose lengths are controllable by feedback control circuitry or hydraulic cylinders precisely controlled by a miniature hydraulic pump and feedback control circuitry. The particular implementation employed depends on other system limitations such as power consumption limitations, other available resources, cost and precision requirements.

It will be apparent that many modifications and variations may be effected without departing from the teachings and concepts of the present disclosure. Thus, the scope of the following claims extends not only to those embodiments previously described but to all other embodiments that may be contemplated by the disclosure and the following claims.

What is claimed is:

1. A coded target reader that captures reflected light from a coded target and converts the reflected light into an image, the coded target reader comprising:
   an optical system that receives reflected light from a coded target and produces an optical image;
   a photo detector that receives the optical image from the optical system and converts the optical image into a captured coded image; and
   a configuration of the optical system and the photo detector compensating for an oblique reading angle of the coded target reader.

2. The coded target reader of claim 1, wherein the optical system spreads at least a portion of the reflected light from the coded target to alter relative dimensions of the optical image.

3. The coded target reader of claim 1, wherein alignment of the photo detector compensates for the oblique reading angle.

4. The coded target reader of claim 1 further comprising image processing circuitry that identifies orientation based upon determined boundaries of a captured coded image and reference boundaries for the captured coded image.

5. A coded target reader that captures reflected light from a coded target and converts the reflected light into a captured coded image, the coded target reader comprising:
   an optical system that receives reflected light from a coded target and produces an optical image;
   an optical detector that receives the optical image from the optical system and converts the optical image into a captured coded image; and the orientation of the optical system and optical detector compensating for the oblique reading angle of the coded target reader.

6. The coded target reader of claim 5, wherein the orientation adjusts at least one of a height and a width of the optical image to produce the corrected coded image.

7. The coded target reader of claim 5 further comprising image processing circuitry that identifies orientation based upon detected boundaries of the captured coded image.

8. A coded target reader that captures reflected light from a coded target and converts the reflected light into an image, the coded target reader comprising:
   an optical system that receives reflected light from a coded target and produces an optical image;
   a photo detector that receives the optical image from the optical system and converts the optical image into a captured coded image; and
   image adjustment circuitry that adjusts operation of the optical system and the photo detector to compensate for an oblique reading angle of the coded target reader.

9. The coded target reader of claim 8, wherein the optical system includes an image adjusting component operable by the image adjustment circuitry that selectively spreads at least a portion of the reflected light from the coded target to alter relative dimensions of the optical image.

10. The coded target reader of claim 8, wherein the optical detector further comprises an adjustment mechanism controllable by the image adjustment circuitry that alters an alignment of the photo detector to compensate for the oblique reading angle.

11. The coded target reader of claim 8, wherein the image adjustment circuitry determines correction parameters based upon determined boundaries of a captured coded image and reference boundaries for the captured coded image.

12. The coded target reader of claim 11, wherein the image adjustment circuitry adjusts operation of the optical system and photo detector based upon the correction parameters.

13. The coded target reader of claim 8, wherein the image adjustment circuitry determines all oblique reading angle based upon boundaries of a captured coded image and reference boundaries for the captured coded image and positions the photo detector at the oblique reading angle.

14. A coded target reader that captures reflected light from a coded target and converts the reflected light into a captured coded image, the coded target reader comprising:
   an optical system that receives reflected light from a coded target and produces an optical image;
   an optical detector that receives the optical image from the optical system and converts the optical image into a captured coded image;
   image adjustment circuitry that receives the captured coded image, adjusts the captured coded image to compensate for oblique viewing angles of the coded target reader to produce a corrected coded image and directs the corrected coded image to storage.

15. The coded target reader of claim 14, wherein the image adjustment circuitry includes correction modes that adjusts a height and a width of the captured coded image to produce the corrected coded image.

16. The coded target reader of claim 14, wherein the image adjustment circuitry includes correction modes that alter rows of data received from the optical detector as they are received from the optical detector.

17. The coded target reader of claim 14, wherein the image adjustment circuitry includes correction modes that inserts data points into rows of data of the captured coded image to produce the corrected coded image.

18. The coded target reader of claim 14, wherein the image adjustment circuitry includes correction modes that delete data points from rows of data of the captured coded image to produce the corrected coded image.

19. The coded target reader of claim 14, wherein the image adjustment circuitry determines correction parameters based upon detected boundaries of the captured coded image and wherein the image adjustment circuitry uses the correction parameters to operate upon captured coded images to produce the corrected coded image.

* * * * *